US012613638B2

(12) United States Patent
Colgrove et al.

(10) Patent No.: US 12,613,638 B2
(45) Date of Patent: Apr. 28, 2026

(54) EFFICIENT EXECUTION OF I/O OPERATIONS IN A STORAGE ENVIRONMENT

(71) Applicant: PURE STORAGE, INC., Santa Clara, CA (US)

(72) Inventors: John Colgrove, Los Altos, CA (US); Craig Harmer, San Francisco, CA (US); John Hayes, Mountain View, CA (US); Bo Hong, Palo Alto, CA (US); Ethan Miller, Santa Cruz, CA (US); Feng Wang, Los Altos, CA (US); Ronald Karr, Palo Alto, CA (US)

(73) Assignee: EVERPURE, INC., Santa Clara, CA (US)

( * ) Notice: Subject to any disclaimer, the term of this patent is extended or adjusted under 35 U.S.C. 154(b) by 0 days.

(21) Appl. No.: 18/590,246

(22) Filed: Feb. 28, 2024

(65) Prior Publication Data

US 2024/0201869 A1 Jun. 20, 2024

Related U.S. Application Data

(63) Continuation-in-part of application No. 17/723,318, filed on Apr. 18, 2022, now abandoned, which is a
(Continued)

(51) Int. Cl.
*G06F 3/06* (2006.01)
*G06F 11/07* (2006.01)
(Continued)

(52) U.S. Cl.
CPC ............ *G06F 3/0619* (2013.01); *G06F 3/061* (2013.01); *G06F 3/0611* (2013.01);
(Continued)

(58) Field of Classification Search
CPC ............. G06F 11/0727; G06F 11/0751; G06F 11/1076; G06F 12/0804; G06F 12/0868;
(Continued)

(56) References Cited

U.S. PATENT DOCUMENTS 5,706,210 A 1/1998 Kumano et al.
5,799,200 A 8/1998 Brant et al.
(Continued)

FOREIGN PATENT DOCUMENTS

CN 101681282 A 3/2010
EP 0725324 A2 8/1996
(Continued)

OTHER PUBLICATIONS

Bellamy-Mcintyre J., et al., "OpenID and the Enterprise: A Model-based Analysis of Single Sign-On Authentication," (online), 2011, 15th IEEE International Enterprise Distributed Object Computing Conference (EDOC), Dated Aug. 29, 2011, 10 pages, DOI:10.1109/EDOC.2011.26, ISBN: 978-1-4577-0362-1, Retrieved fromURL:https://www.cs.auckland.ac.nz/lutteroth/publications/McintyreLutterothWeber2011-OpenID.pdf.
(Continued)

*Primary Examiner* — Hashem Farrokh

(57) ABSTRACT

A system and method for efficient execution of I/O operations in a storage environment including receiving, by a storage controller, an incoming I/O operation that can be serviced by a storage device while at least one pending operation is to be processed using the storage device, determining, based on an analysis by the storage controller of an operational state of a storage system that includes the storage device, whether processing the at least one pending operation is more efficient than issuing an alternative operation to the storage device, and issuing, by the storage controller, one or more instructions to the storage device.

20 Claims, 17 Drawing Sheets

Related U.S. Application Data continuation of application No. 15/221,686, filed on Jul. 28, 2016, now Pat. No. 11,307,772, which is a continuation of application No. 14/513,007, filed on Oct. 13, 2014, now Pat. No. 9,436,396, which is a continuation of application No. 14/083,161, filed on Nov. 18, 2013, now Pat. No. 8,862,820, which is a continuation of application No. 12/882,872, filed on Sep. 15, 2010, now Pat. No. 8,589,625.

(60) Provisional application No. 63/471,227, filed on Jun. 5, 2023.

(51) Int. Cl.
*G06F 11/10* (2006.01)
*G06F 12/0804* (2016.01)

(52) U.S. Cl.
CPC .......... *G06F 3/0613* (2013.01); *G06F 3/0629* (2013.01); *G06F 3/0646* (2013.01); *G06F 3/0653* (2013.01); *G06F 3/0659* (2013.01); *G06F 3/0665* (2013.01); *G06F 3/067* (2013.01); *G06F 3/0685* (2013.01); *G06F 3/0688* (2013.01); *G06F 3/0689* (2013.01); *G06F 11/0727* (2013.01); *G06F 11/0751* (2013.01); *G06F 11/1076* (2013.01); *G06F 12/0804* (2013.01)

(58) Field of Classification Search
CPC ..... G06F 2212/1008; G06F 2212/1024; G06F 2212/214; G06F 2212/507; G06F 2212/7204; G06F 3/061; G06F 3/0611; G06F 3/0613; G06F 3/0619; G06F 3/0629; G06F 3/0646; G06F 3/0653; G06F 3/0659; G06F 3/0665; G06F 3/067; G06F 3/0685; G06F 3/0688; G06F 3/0689
USPC ........................................................ 711/167
See application file for complete search history.

(56) References Cited

U.S. PATENT DOCUMENTS

| | | | |
|---|---|---|---|
| 5,933,598 A | 8/1999 | Scales et al. | |
| 6,012,032 A | 1/2000 | Donovan et al. | |
| 6,085,333 A | 7/2000 | DeKoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,437,530 B1 | 10/2008 | Rajan | |
| 7,480,818 B2* | 1/2009 | Makita ................ G06F 11/1092 |
| | | | 714/6.24 |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 7,975,115 B2 | 7/2011 | Wayda et al. | |
| 8,042,163 B1 | 10/2011 | Karr et al. | |
| 8,086,585 B1 | 12/2011 | Brashers et al. | |
| 8,271,700 B1 | 9/2012 | Annem et al. | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,504,797 B2 | 8/2013 | Mimatsu | |
| 8,566,546 B1 | 10/2013 | Marshak et al. | |
| 8,578,442 B1 | 11/2013 | Banerjee | |
| 8,613,066 B1 | 12/2013 | Brezinski et al. | |

| | | | |
|---|---|---|---|
| 8,620,970 B2 | 12/2013 | English et al. | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,812,860 B1 | 8/2014 | Bray | |
| 8,822,155 B2 | 9/2014 | Sukumar et al. | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,250,823 B1 | 2/2016 | Kamat et al. | |
| 9,280,678 B2 | 3/2016 | Redberg | |
| 9,300,660 B1 | 3/2016 | Borowiec et al. | |
| 9,395,922 B2 | 7/2016 | Nishikido et al. | |
| 9,444,822 B1 | 9/2016 | Borowiec et al. | |
| 9,507,532 B1 | 11/2016 | Colgrove et al. | |
| 10,324,639 B2 | 6/2019 | Seo | |
| 10,567,406 B2 | 2/2020 | Astigarraga et al. | |
| 10,846,137 B2 | 11/2020 | Vallala et al. | |
| 10,877,683 B2 | 12/2020 | Wu et al. | |
| 11,076,509 B2 | 7/2021 | Alissa et al. | |
| 11,106,810 B2 | 8/2021 | Natanzon et al. | |
| 11,194,707 B2 | 12/2021 | Stalzer | |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0015371 A1 | 1/2005 | Hetzler et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Van Gundy et al. | |
| 2006/0026347 A1* | 2/2006 | Hung .................. G06F 11/1076 |
| | | | 711/114 |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0195833 A1 | 8/2008 | Park | |
| 2008/0256141 A1 | 10/2008 | Wayda et al. | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2009/0259882 A1* | 10/2009 | Shellhamer ......... G06F 11/1076 |
| | | | 714/E11.085 |
| 2010/0037118 A1* | 2/2010 | Saliba ................... G06F 3/0641 |
| | | | 714/752 |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0306500 A1 | 12/2010 | Mimatsu | |
| 2010/0325345 A1 | 12/2010 | Ohno et al. | |

(56)         References Cited

U.S. PATENT DOCUMENTS

| | | |
|---|---|---|
| 2010/0332754 A1 | 12/2010 | Lai et al. |
| 2011/0035540 A1 | 2/2011 | Fitzgerald et al. |
| 2011/0072290 A1 | 3/2011 | Davis et al. |
| 2011/0125955 A1 | 5/2011 | Chen |
| 2011/0131231 A1 | 6/2011 | Haas et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0220561 A1 | 8/2014 | Sukumar et al. |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0154418 A1 | 6/2015 | Redberg |
| 2015/0193169 A1 | 7/2015 | Sundaram et al. |
| 2015/0378888 A1 | 12/2015 | Zhang et al. |
| 2016/0026397 A1 | 1/2016 | Nishikido et al. |
| 2016/0098323 A1 | 4/2016 | Mutha et al. |
| 2016/0182542 A1 | 6/2016 | Staniford |
| 2016/0248631 A1 | 8/2016 | Duchesneau |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0262202 A1 | 9/2017 | Seo |
| 2018/0054454 A1 | 2/2018 | Astigarraga et al. |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0360833 A1 | 11/2021 | Alissa et al. |

FOREIGN PATENT DOCUMENTS

| | | | | |
|---|---|---|---|---|
| EP | 2164006 A2 | 3/2010 | | |
| JP | 2003503766 A | 1/2003 | | |
| JP | 2005092876 A | 4/2005 | | |
| JP | 2006106975 A | 4/2006 | | |
| JP | 2007115019 A | 5/2007 | | |
| JP | 2007529060 A | 10/2007 | | |
| JP | 2012513060 A | 6/2012 | | |
| JP | 2013529315 A | 7/2013 | | |
| JP | 2014142940 A | 8/2014 | | |
| WO | 2010071655 | * | 6/2010 | ............ G06F 12/02 |
| WO | WO-2012087648 A2 | 6/2012 | | |
| WO | WO-2013071087 A1 | 5/2013 | | |
| WO | WO-2014110137 A1 | 7/2014 | | |
| WO | WO-2016015008 A1 | 1/2016 | | |
| WO | WO-2016190938 A1 | 12/2016 | | |
| WO | WO-2016195759 A1 | 12/2016 | | |
| WO | WO-2016195958 A1 | 12/2016 | | |
| WO | WO-2016195961 A1 | 12/2016 | | |

OTHER PUBLICATIONS

ETSI: "Network Function Virtualisation (NFV); Resiliency Requirements," ETSI GS NFV-REL 001, V1.1.1, etsi.org (Online), Jan. 2015, 82 Pages, Retrieved from URL:www.etsi.org/deliver/etsi_gs/NFV-RELJ001_099/001/01.01.01_60/gs_NFV-REL001v010101p.pdf.

Extended European Search Report for European Application No. 17154034.7, mailed Apr. 28, 2017, 9 pages.

Faith R., "Dictzip File Format," GitHub.com (Online), 01 Page, [Accessed on Jul. 28, 2015] Retrieved from URL: github.com/fidlej/idzip.

Google Search of: "Storage Array Define," Performed by the Examiner for U.S. Appl. No. 14/725,278 on Nov. 4, 2015 , Results Limited to Entries Dated before 2012, 01 Page.

Hota C., et al., "Capability-Based Cryptographic Data Access Control in Cloud Computing," International Journal of Advanced Networking and Applications, Eswar Publications, India, Aug. 13, 2011, vol. 1, No. 1,10 Pages.

Hu X-Y., et al., "Container Marking: Combining Data Placement, Garbage Collection and Wear Levelling for Flash," 19th Annual IEEE International Symposium on Modeling, Analysis, and Simulation of Computer and Telecommunications Systems, Jul. 25-27, 2011, 11 Pages, DOI: 10.1109/MASCOTS.2011.50, ISBN: 978-0-7695-4430-4.

Hwang K., et al., "RAID-x: A New Distributed Disk Array for I/O-Centric Cluster Computing," Proceedings of The Ninth International Symposium on High-performance Distributed Computing, IEEE Computer Society, Los Alamitos, CA, Aug. 2000, pp. 279-286.

International Search Report and Written Opinion for International Application No. PCT/US2016/015006, Apr. 29, 2016, 12 pages.

International Search Report and Written Opinion for International Application No. PCT/US2016/016333, Jun. 8, 2016, 12 pages.

International Search Report and Written Opinion for International Application No. PCT/US2016/020410, mailed Jul. 8, 2016, 17 pages.

International Search Report and Written Opinion for International Application No. PCT/US2016/032052, mailed Aug. 30, 2016, 17 Pages.

International Search Report and Written Opinion for International Application No. PCT/US2016/032084, mailed Jul. 18, 2016, 12 Pages.

International Search Report and Written Opinion for International Application No. PCT/US2016/035492, mailed Aug. 17, 2016, 10 pages.

International Search Report and Written Opinion for International Application No. PCT/US2016/036693, mailed Aug. 29, 2016, 10 Pages.

International Search Report and Written Opinion for International Application No. PCT/US2016/038758, mailed Oct. 7, 2016, 10 Pages.

(56) References Cited

OTHER PUBLICATIONS

International Search Report and Written Opinion for International Application No. PCT/US2016/040393, mailed Sep. 22, 2016, 10 Pages.

International Search Report and Written Opinion for International Application No. PCT/US2016/044020, mailed Sep. 30, 2016, 11 Pages.

International Search Report and Written Opinion for International Application No. PCT/US2016/044874, mailed Oct. 7, 2016, 11 Pages.

International Search Report and Written Opinion for International Application No. PCT/US2016/044875, mailed Oct. 5, 2016, 13 pages.

International Search Report and Written Opinion for International Application No. PCT/US2016/044876, mailed Oct. 21, 2016, 12 Pages.

International Search Report and Written Opinion for International Application No. PCT/US2016/044877, mailed Sep. 29, 2016, 13 pages.

International Search Report and Written Opinion of the International Application No. PCT/US2016/015008, mailed May 4, 2016, 12 pages.

Kong K., "Using PCI Express as the Primary System Interconnect in Multiroot Compute, Storage, Communications and Embedded Systems," IDT, White Paper, Aug. 28, 2008, 12 Pages, [Retrieved by WIPO on Dec. 1, 2014] Retrieved from URL: http://www.idt.com/document/whp/idt-pcie-multi-root-white-paper.

Li J., et al., "Access Control for the Services Oriented Architecture," Proceedings of the ACM Workshop on Secure Web Services (SWS), ACM, New York, Nov. 2, 2007, pp. 9-17.

Microsoft: "Hybrid for SharePoint Server 2013—Security Reference Architecture," Oct. 1, 2014, pp. 1-53, XP055296534, [Retrieved on Aug. 19, 2016] Retrieved from URL: http://hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity," (online), Dated Apr. 2014, 36 pages, Retrieved from URL: http://aka.ms/HybridIdentityWp.

PCMAG: "Storage Array Definition," Published May 10, 2013, 1 page, Retrieved from URL: http://web.archive.org/web/20130510121646/ http://www.pcmag.com/encyclopedia/term/52091/storage-array.

Stalzer M.A., "FlashBlades: System Architecture and Applications," Proceedings of the 2nd Workshop on Architectures and Systems for Big Data, Association for Computing Machinery, New York, NY, 2012, pp. 10-14.

Storer M.W., et al., "Secure Data Deduplication," Proceedings of the 4th ACM International Workshop on Storage Security and Survivability (StorageSS'08), ACM New York, NY, USA, Oct. 31, 2008, 10 Pages, DOI: 10.1145/1456471.

Storer M.W., et al., "Pergamum: Replacing Tape with Energy Efficient, Reliable, Disk-Based Archival Storage," 6th Usenix Conference on File And Storage Technologies (FAST'08), San Jose, CA, USA, Feb. 26-29, 2008, 16 Pages, ISBN 978-1-931971-56-0, XP002665467.

Sweere P., "Creating Storage Class Persistent Memory with NVDIMM," Flash Memory Summit, Aug. 2013, 22 Pages, Retrieved from URL: http://www.flashmemorysummit.com/English/Collaterals/Proceedings/2013/20130814_T2_Sweere. pdf.

Techopedia, "What is a Disk Array," techopedia.com (online), Jan. 13, 2012, 1 Page, Retrieved from URL: https://web.archive.org/web/20120113053358/ http://www.techopedia.com/definition/1009/disk-array.

Webopedia, "What is a disk array," webopedia.com (online), May 26, 2011, 2 Pages, Retrieved from URL: https://web/archive.org/web/20110526081214/ http://www.webopedia.com/TERM/D/disk_array.html.

Wikipedia, "Convergent Encryption," Wikipedia.org (online), Accessed on Sep. 8, 2015, 2 pages, Retrieved from URL: en.wikipedia.org/wiki/Convergent_encryption.

* cited by examiner

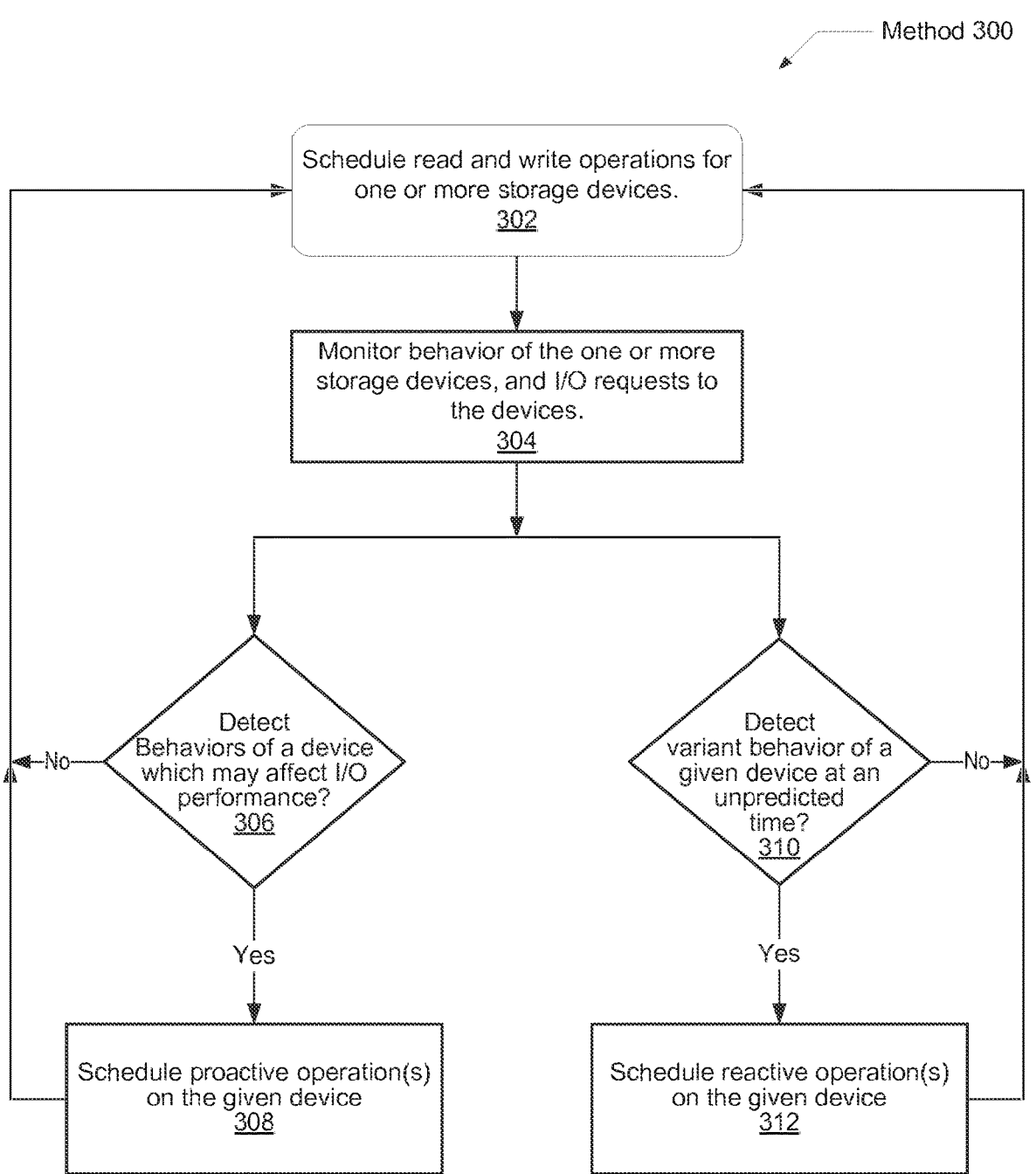

Method 300

Schedule read and write operations for one or more storage devices.
302

Monitor behavior of the one or more storage devices, and I/O requests to the devices.
304

Detect Behaviors of a device which may affect I/O performance?
306

Detect variant behavior of a given device at an unpredicted time?
310

No

No

Yes

Yes

Schedule proactive operation(s) on the given device
308

Schedule reactive operation(s) on the given device
312

FIG. 3

Method 400

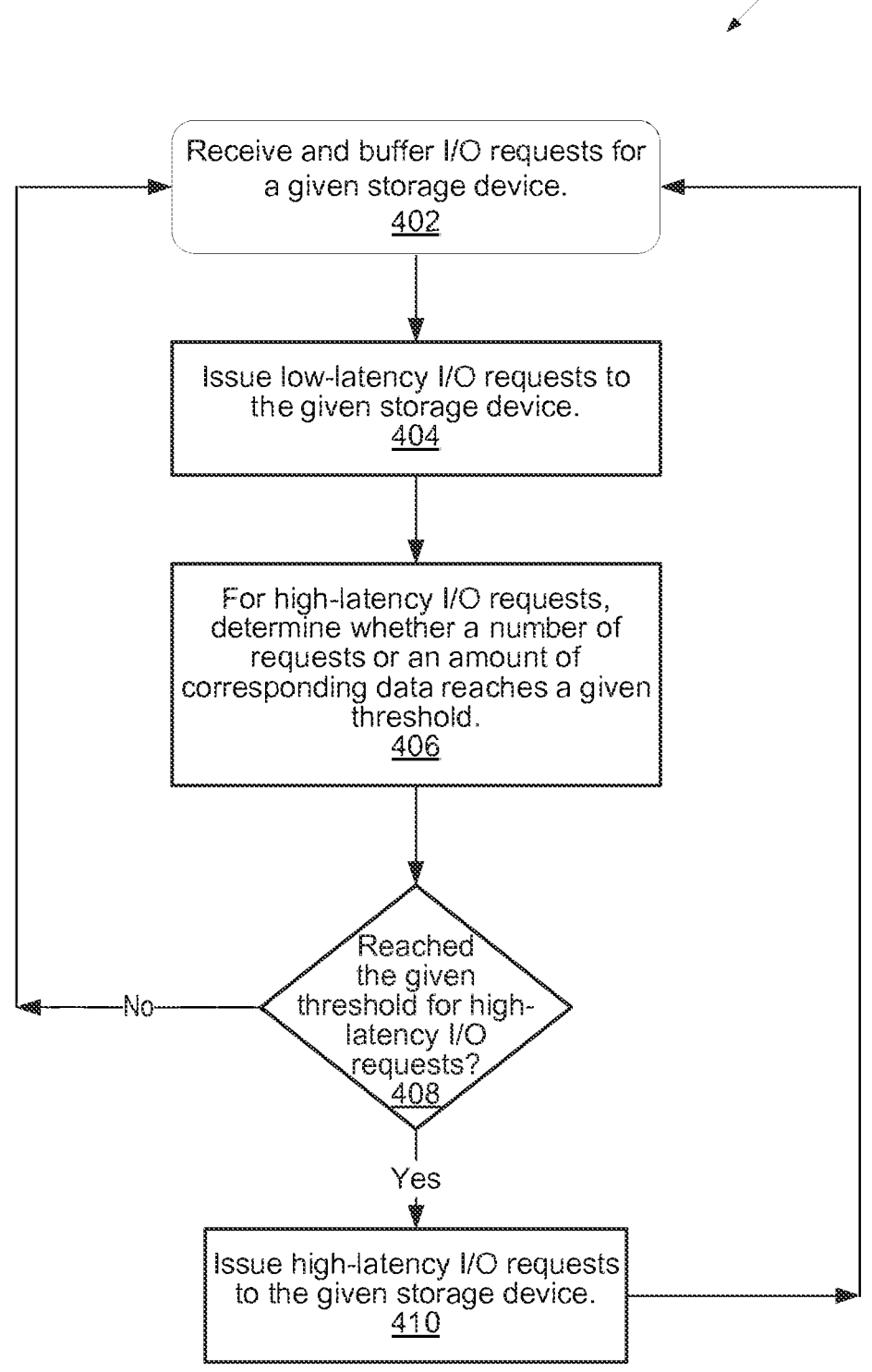

Receive and buffer I/O requests for a given storage device.
402

Issue low-latency I/O requests to the given storage device.
404

For high-latency I/O requests, determine whether a number of requests or an amount of corresponding data reaches a given threshold.
406

Reached the given threshold for high-latency I/O requests?
408

No

Yes

Issue high-latency I/O requests to the given storage device.
410

FIG. 4

Method 500

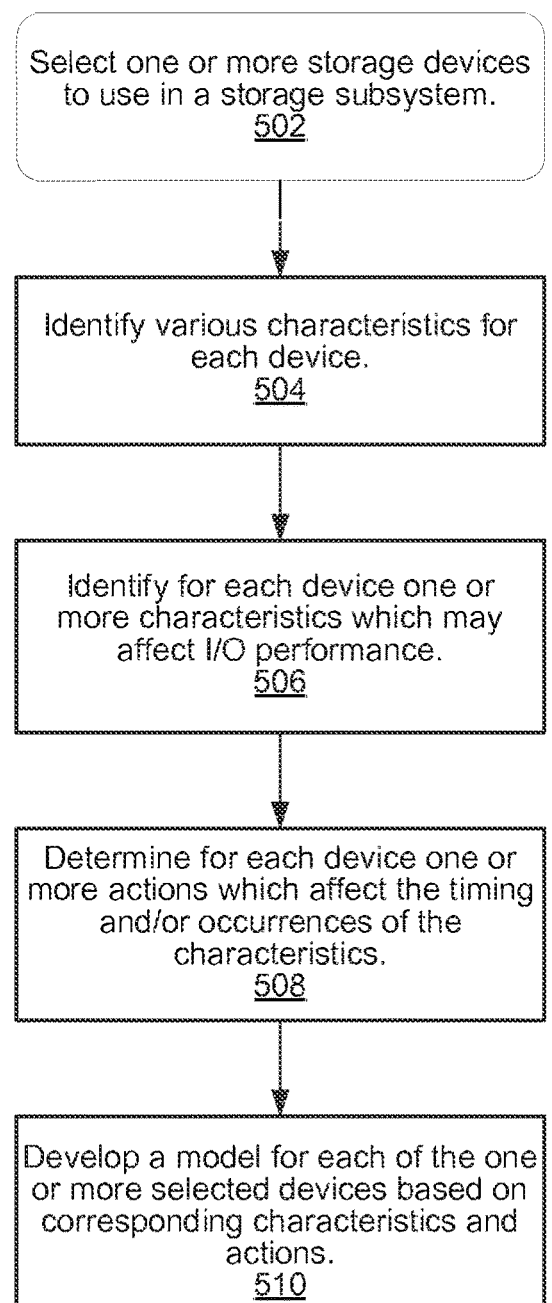

Select one or more storage devices to use in a storage subsystem.
502

Identify various characteristics for each device.
504

Identify for each device one or more characteristics which may affect I/O performance.
506

Determine for each device one or more actions which affect the timing and/or occurrences of the characteristics.
508

Develop a model for each of the one or more selected devices based on corresponding characteristics and actions.
510

FIG. 5

State Table 722

| Device Age 802 |
| --- |
| Error Rate 804 |
| Total Errors 806 |
| Number of Recoverable Errors 808 |
| Number of Unrecoverable Errors 810 |
| Access Rate 812 |
| Data Age 814 |
| Cache Size 816 |
| Cache Flush Idle Time 818 |
| Allocation State of a First Allocation Space 820 |
| Allocation State of a Second Allocation Space 822 |
| Concurrency Level 824 |
| Expected Time(s) 826 |

FIG. 8

Method 900

Monitor each of the storage devices.
902

Detect
a given device
exceeds an idle time
threshold?
904

No

Yes

Detect
a cache in a given
device exceeds an
occupancy
threshold?
906

No

Yes

Detect
cache data in a
given device
exceeds an age
threshold?
908

No

Yes

Initiate a proactive
operation for the given
device.
910

Method 1100

Determine to reduce a number N of
storage devices within a storage
subsystem executing high-latency
operations.
1102

Select a given device executing high-
latency operations.
1104

Halt the execution of the high-latency
operations on the given device.
Decrement N.
1106

Initiate execution of low-latency
operations on the given device.
1108

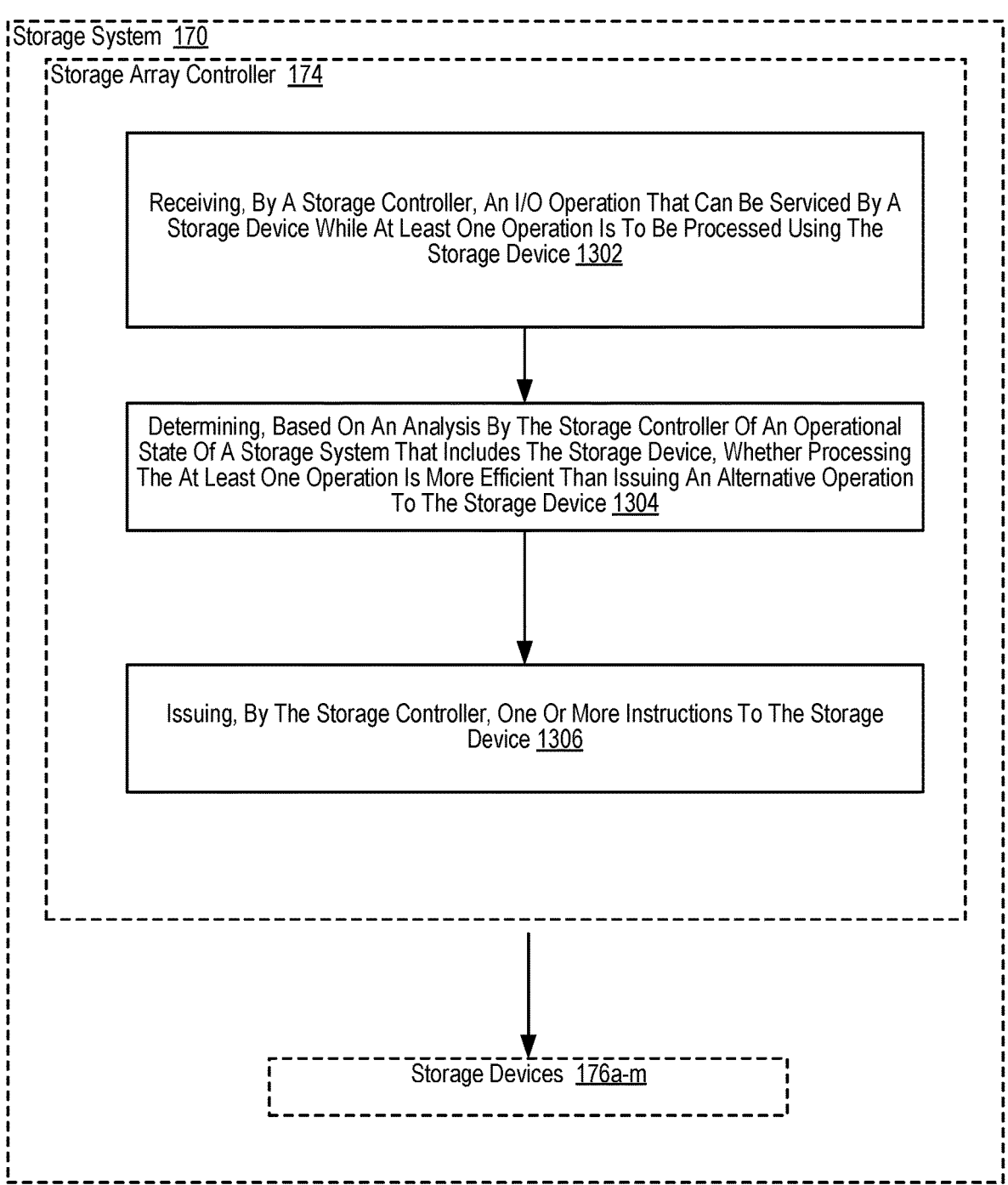

Storage System 170

Storage Array Controller 174

Receiving, By A Storage Controller, An I/O Operation That Can Be Serviced By A Storage Device While At Least One Operation Is To Be Processed Using The Storage Device 1302

Determining, Based On An Analysis By The Storage Controller Of An Operational State Of A Storage System That Includes The Storage Device, Whether Processing The At Least One Operation Is More Efficient Than Issuing An Alternative Operation To The Storage Device 1304

Issuing, By The Storage Controller, One Or More Instructions To The Storage Device 1306

Storage Devices 176a-m

FIG. 13

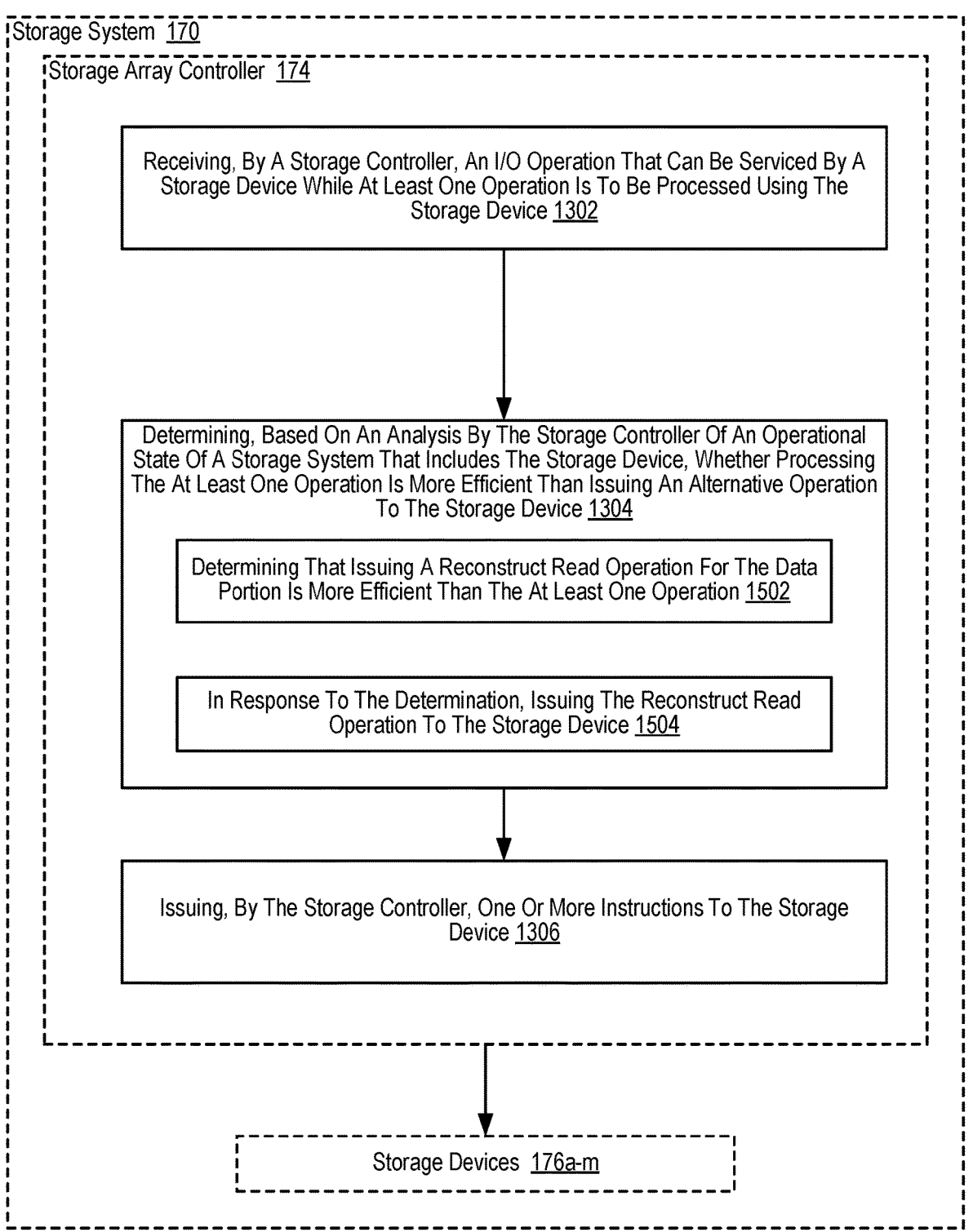

Storage System 170

Storage Array Controller 174

Receiving, By A Storage Controller, An I/O Operation That Can Be Serviced By A Storage Device While At Least One Operation Is To Be Processed Using The Storage Device 1302

Determining, Based On An Analysis By The Storage Controller Of An Operational State Of A Storage System That Includes The Storage Device, Whether Processing The At Least One Operation Is More Efficient Than Issuing An Alternative Operation To The Storage Device 1304

Determining That Issuing A Reconstruct Read Operation For The Data Portion Is More Efficient Than The At Least One Operation 1502

In Response To The Determination, Issuing The Reconstruct Read Operation To The Storage Device 1504

Issuing, By The Storage Controller, One Or More Instructions To The Storage Device 1306

Storage Devices 176a-m

FIG. 15

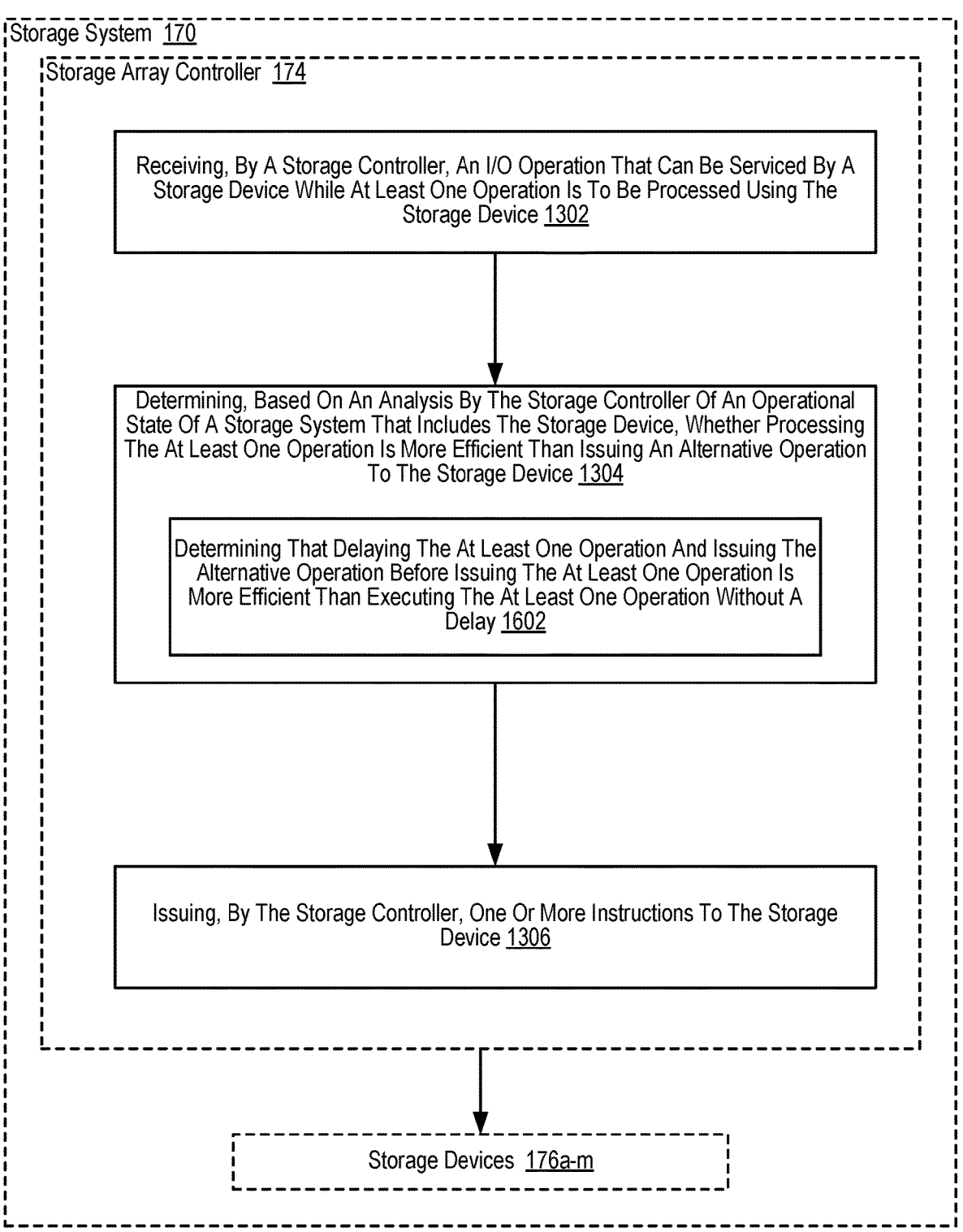

Storage System 170

Storage Array Controller 174

Receiving, By A Storage Controller, An I/O Operation That Can Be Serviced By A Storage Device While At Least One Operation Is To Be Processed Using The Storage Device 1302

Determining, Based On An Analysis By The Storage Controller Of An Operational State Of A Storage System That Includes The Storage Device, Whether Processing The At Least One Operation Is More Efficient Than Issuing An Alternative Operation To The Storage Device 1304

Determining That Delaying The At Least One Operation And Issuing The Alternative Operation Before Issuing The At Least One Operation Is More Efficient Than Executing The At Least One Operation Without A Delay 1602

Issuing, By The Storage Controller, One Or More Instructions To The Storage Device 1306

Storage Devices 176a-m

FIG. 16

EFFICIENT EXECUTION OF I/O OPERATIONS IN A STORAGE ENVIRONMENT

CROSS REFERENCE TO RELATED APPLICATIONS

This is a continuation in-part application for patent entitled to a filing date and claiming the benefit of earlier-filed U.S. patent application Ser. No. 17/723,318, filed Apr. 18, 2022, herein incorporated by reference in its entirety, which is a continuation of U.S. Pat. No. 11,307,772, issued Apr. 19, 2022, which is a continuation of U.S. Pat. No. 9,436,396, issued Sep. 6, 2016, which is a continuation of U.S. Pat. No. 8,862,820, issued Oct. 14, 2014, which is a continuation of U.S. Pat. No. 8,589,625, issued Nov. 19, 2013; this is also a non-provisional application entitled to a filing date and claiming the benefit of earlier-filed U.S. Provisional Patent Application No. 63/471,227, filed Jun. 5, 2023.

BRIEF DESCRIPTION OF THE DRAWINGS

FIG. 3 is a generalized flow diagram illustrating one embodiment of a method for adjusting I/O scheduling to reduce unpredicted variable I/O response times on a data storage subsystem.

FIG. 4 is a generalized block diagram illustrating one embodiment of a method for segregating operations issued to a storage device.

FIG. 5 is a generalized flow diagram illustrating one embodiment of a method for developing a model to characterize the behavior of storage devices in a storage subsystem.

FIG. 8 is a generalized block diagram illustrating another embodiment of a state table.

FIG. 13 sets forth a flow chart illustrating an example method of efficient execution of I/O operations in a storage environment.

FIG. 15 sets forth a flow chart illustrating an example method of efficient execution of I/O operations in a storage environment.

FIG. 16 sets forth a flow chart illustrating an example method of efficient execution of I/O operations in a storage environment.

Figure 1:
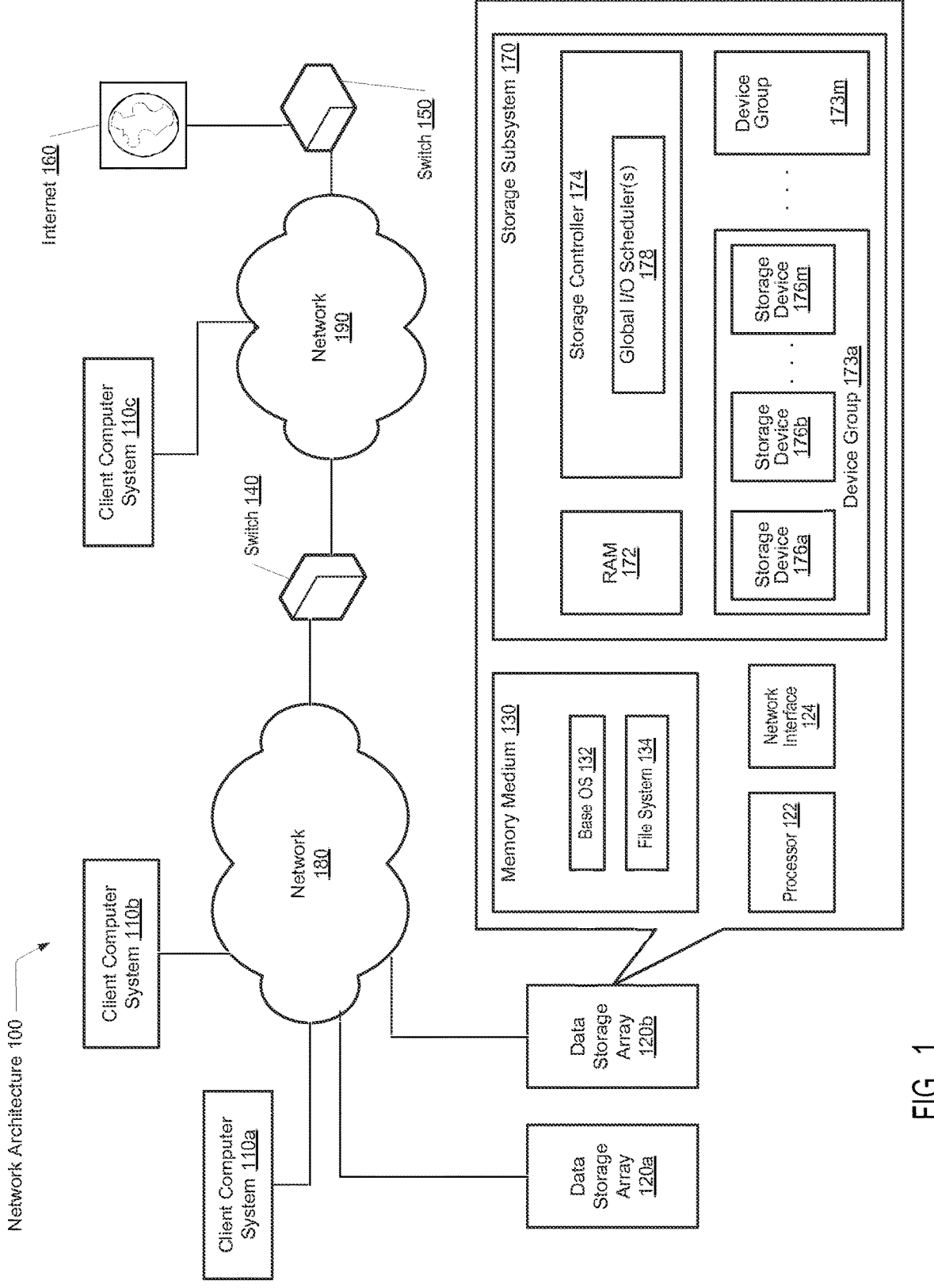
FIG. 1 is a generalized block diagram illustrating one embodiment of network architecture.

While the invention is susceptible to various modifications and alternative forms, specific embodiments are shown by way of example in the drawings and are herein described in detail. It is to be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art will recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or other outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 1 is provided shortly. First, an overview of some of the features provided by the data storage arrays 120a-120b is described.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. Such clients may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m uses a particular technology and mechanism for performing data storage. The type of technology and mechanism used within each of the storage devices 176a-176m may at least in part be used to determine the algorithms used for controlling and scheduling read and write operations to and from each of the storage devices 176a-176m. The logic used in these algorithms may be included in one or more of a base operating system (OS) 116, a file system 140, one or more global I/O schedulers 178 within a storage array controller 174, control logic within each of the storage devices 176a-176m, or otherwise. Additionally, the logic, algorithms, and control mechanisms described herein may comprise hardware and/or software.

Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks). In some embodiments, each of the storage devices 176a-176m may utilize technology for data storage that is different from a conventional hard disk drive (HDD). For example, one or more of the storage devices 176a-176m may include or be further coupled to storage consisting of solid-state memory to store persistent data. In other embodiments, one or more of the storage devices 176a-176m may include or be further coupled to storage using other technologies such as spin torque transfer technique, magnetoresistive random access memory (MRAM) technique, shingled disks, memristors, phase change memory, or other storage technologies. These different storage techniques and technologies may lead to differing I/O characteristics between storage devices.

In one embodiment, the included solid-state memory comprises solid-state drive (SSD) technology. Typically, SSD technology utilizes Flash memory cells. As is well known in the art, a Flash memory cell holds a binary value based on a range of electrons trapped and stored in a floating gate. A fully erased Flash memory cell stores no or a minimal number of electrons in the floating gate. A particular binary value, such as binary 1 for single-level cell (SLC) Flash, is associated with an erased Flash memory cell. A multi-level cell (MLC) Flash has a binary value 11 associated with an erased Flash memory cell. After applying a voltage higher than a given threshold voltage to a controlling gate within a Flash memory cell, the Flash memory cell traps a given range of electrons in the floating gate. Accordingly, another particular binary value, such as binary 0 for SLC Flash, is associated with the programmed (written) Flash memory cell. A MLC Flash cell may have one of multiple binary values associated with the programmed memory cell depending on the voltage applied to the control gate.

The differences in technology and mechanisms between HDD technology and SDD technology may lead to differences in input/output (I/O) characteristics of the data storage devices 176a-176m. Generally speaking, SSD technologies provide lower read access latency times than HDD technologies. However, the write performance of SSDs is generally slower than the read performance and may be significantly impacted by the availability of free, programmable blocks within the SSD. As the write performance of SSDs is significantly slower compared to the read performance of SSDs, problems may occur with certain functions or operations expecting latencies similar to reads. Additionally, scheduling may be made more difficult by long write latencies that affect read latencies. Accordingly, different algorithms may be used for I/O scheduling in each of the data storage arrays 120a-120b.

In one embodiment, where different types of operations such as read and write operations have different latencies, algorithms for I/O scheduling may segregate these operations and handle them separately for purposes of scheduling. For example, within one or more of the storage devices 176a-176m, write operations may be batched by the devices themselves, such as by storing them in an internal cache. When these caches reach a given occupancy threshold, or at some other time, the corresponding storage devices 176a-176m may flush the cache. In general, these cache flushes may introduce added latencies to read and/or writes at unpredictable times, which leads to difficulty in effectively scheduling operations. Therefore, an I/O scheduler may utilize characteristics of a storage device, such as the size of the cache or a measured idle time, in order to predict when such a cache flush may occur. Knowing characteristics of each of the one or more storage devices 176a-176m may lead to more effective I/O scheduling. In one embodiment, the global I/O scheduler 178 may detect a given device of the one or more of the storage devices 176a-176m is exhibiting long response times for I/O requests at unpredicted times. In response, the global I/O scheduler 178 may schedule a given operation to the given device in order to cause the device to resume exhibiting expected behaviors. In one embodiment, such an operation may be a cache flush command, a trim command, an erase command, or otherwise. Further details concerning I/O scheduling will be discussed below.

Components of a Network Architecture

Again, as shown, network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Networks 180 and 190 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 180 and 190. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110a-110c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 110a-110c may include a hypervisor used to support virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources and access to logical storage entities (e.g., LUNs) built upon the storage devices 176a-176m within each of the data storage arrays 120a-120b.

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be an SSD. A storage array controller 174 may comprise logic for handling received read/write requests. For example, the algorithms briefly described above may be executed in at least storage array controller 174. A random-access memory (RAM) 172 may be used to batch operations, such as received write requests. In various embodiments, when batching write operations (or other operations) non-volatile storage (e.g., NVRAM) may be used.

The base OS 132, the file system 134, any OS drivers (not shown) and other software stored in memory medium 130 may provide functionality providing access to files and the management of these functionalities. The base OS 134 and the OS drivers may comprise program instructions stored on the memory medium 130 and executable by processor 122 to perform one or more memory access operations in storage subsystem 170 that correspond to received requests. The system shown in FIG. 1 may generally include one or more file servers and/or block servers.

Each of the data storage arrays 120a-120b may use a network interface 124 to connect to network 180. Similar to client computer systems 110a-110c, in one embodiment, the functionality of network interface 124 may be included on a network adapter card. The functionality of network interface 124 may be implemented using both hardware and software. Both a random-access memory (RAM) and a read-only memory (ROM) may be included on a network card implementation of network interface 124. One or more application specific integrated circuits (ASICs) may be used to provide the functionality of network interface 124.

In one embodiment, a data storage model may be developed which seeks to optimize I/O performance. In one embodiment, the model is based at least in part on characteristics of the storage devices within a storage system. For example, in a storage system which utilizes solid state storage technologies, characteristics of the particular devices may be used to develop models for the devices, which may in turn serve to inform corresponding I/O scheduling algorithms. For example, if particular storage devices being used exhibit write latencies that are relatively high compared to read latencies, such a characteristic may be accounted for in scheduling operations. It is noted that what is considered relatively high or low may vary depending upon the given system, the types of data being processed, the amount of data processed, the timing of data, or otherwise. Generally speaking, the system is programmable to determine what constitutes a low or high latency, and/or what constitutes a significant difference between the two.

Generally speaking, any model which is developed for devices, or a computing system, will be incomplete. Often, there are simply too many variables to account for in a real world system to completely model a given system. In some cases, it may be possible to develop models which are not complete but which are nevertheless valuable. As discussed more fully below, embodiments are described wherein storage devices are modeled based upon characteristics of the devices. In various embodiments, I/O scheduling is performed based on certain predictions as to how the devices may behave. Based upon an understanding of the characteristics of the devices, certain device behaviors are more predictable than others. In order to more effectively schedule operations for optimal I/O performance, greater control over the behavior of the system is desired. Device behaviors which are unexpected, or unpredictable, make it more difficult to schedule operations. Therefore, algorithms are developed which seek to minimize unpredictable or unexpected behavior in the system.

Figure 2:
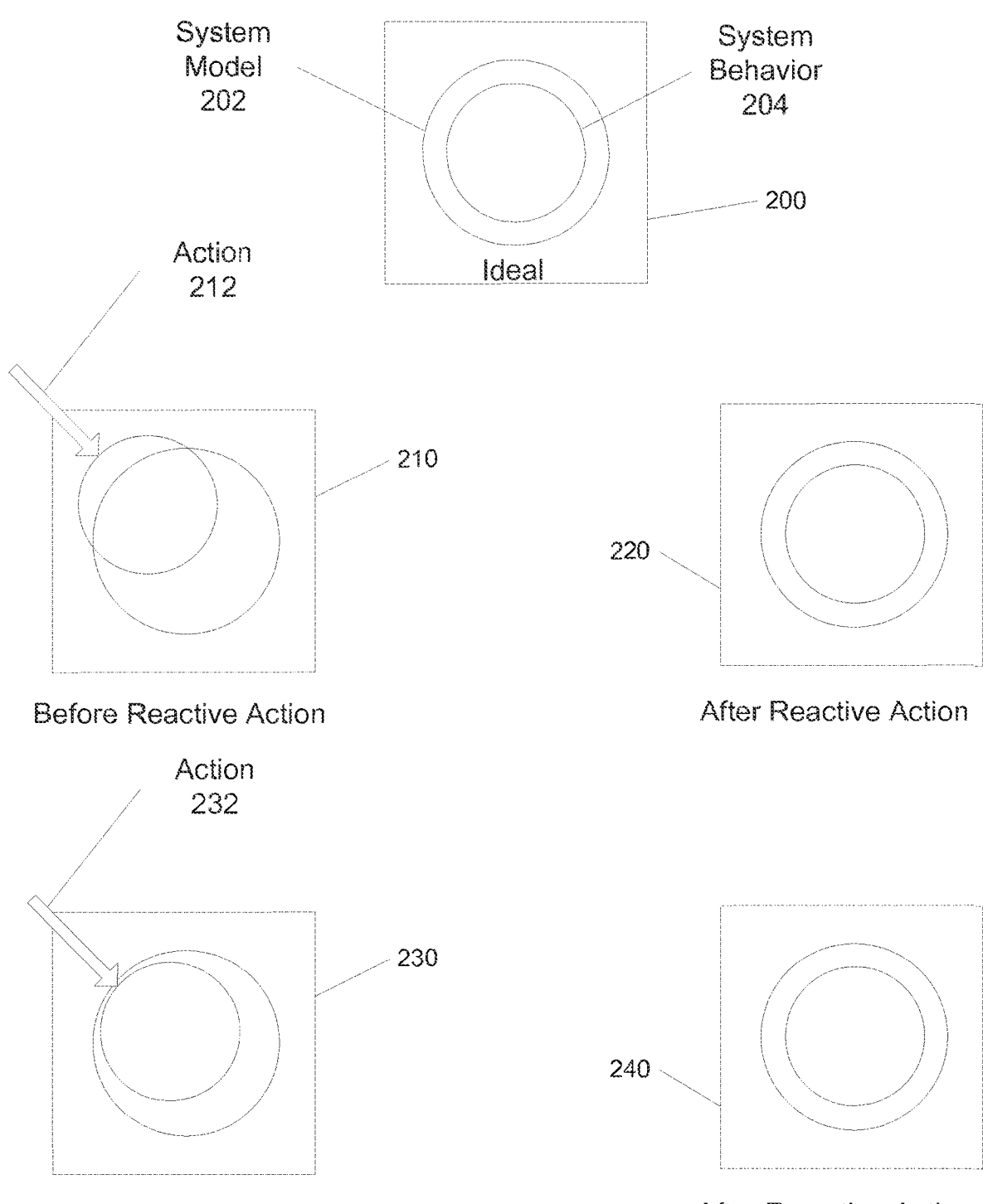
FIG. 2 depicts a conceptual model according to one embodiment of a computing system.

FIG. 2 provides a conceptual illustration of a device or system that is being modeled, and approaches used to minimize unpredictable behaviors within the device or system. In a first block 200, an Ideal scenario is depicted. Shown in block 200 is a system 204 and a model 202 of that system. In one embodiment, the system may be that of a single device. Alternatively, the system may comprise many devices and/or components. As discussed above, the model 202 may not be a complete model of the system 204 it seeks to model. Nevertheless, the model 202 captures behaviors of interest for purposes of the model. In one embodiment, the model 202 may seek to model a computing storage system. In the ideal scenario 200, the actual behavior of the system 204 is "aligned" with that of the model 202. In other words, the behavior of the system 204 generally comports with those behaviors the model 202 seeks to capture. While the system behavior 204 is in accord with that of the model 202, the system behavior may generally be more predictable. Consequently, scheduling of operations (e.g., read and write operations) within the system may be performed more effectively.

For example, if it is desired to optimize read response times, it may be possible to schedule reads so that they are serviced in a timelier manner if other behaviors of the system are relatively predictable. On the other hand, if system behavior is relatively unpredictable, then a level of confidence in an ability to schedule those reads to provide results when desired is diminished. Block 210 illustrates a scenario in which system behavior (the smaller circle) is not aligned with that of the model of that system (the larger circle). In this case, the system is exhibiting behaviors which fall outside of the model. Consequently, system behavior is less predictable and scheduling of operations may become less effective. For example, if solid state memory devices are used in the storage system, and these devices may initiate actions on their own which cause the devices to service requests with greater (or otherwise unexpected) latencies, then any operations which were scheduled for that device may also experience greater or unexpected latencies. One example of such a device operation is an internal cache flush.

In order to address the problem of unexpected or unscheduled system behaviors and corresponding variable performance, the model which is developed may include actions which it may take to restore the system to a less uncertain state. In other words, should the system begin exhibiting behaviors which degrade the model's ability to predict the system's behavior, the model has built into it certain actions it can take to restore the system to a state wherein the particular unexpected behavior is eliminated or rendered less likely. In the example shown, an action 212 is shown which seeks to "move" the system to a state more closely aligned with the model. The action 212 may be termed a "reactive" action or operation as it is performed in response to detecting the system behavior which is outside of the model. Subsequent to performing the action 212, a more ideal state 220 may be achieved.

While developing a model which can react to unpredictable behaviors to move the system to a more ideal state is desirable, the existence of those unpredictable behaviors may still interfere with effective scheduling operations. Therefore, it would be desirable to minimize the occurrence of the unexpected behaviors or events. In one embodiment, a model is developed which includes actions or operations designed to prevent or reduce the occurrence of unexpected behaviors. These actions may be termed "proactive" actions or operations as they may generally be performed proactively in order to prevent the occurrence of some behavior or event, or change the timing of some behavior or event. Block 230 in FIG. 2 illustrates a scenario in which system behavior (the smaller circle) is within that of the model (the larger circle). Nevertheless, the model takes action 232 to move the system behavior in such a way that it remains within the model and perhaps more ideally aligned. The system behavior in block 230 may be seen to be nearing a state where it exhibits behavior outside of the model. In such a case the model may have some basis for believing the system is nearing such a state. For example, if the I/O scheduler has conveyed a number of write operations to a given device, the scheduler may anticipate that the device may perform an internal cache flush operation at some time in the future. Rather than waiting for the occurrence of such an event, the scheduler may proactively schedule a cache flush operation for that device so that the cache flush is performed at a time of the scheduler's choosing. Alternatively, or in addition to the above, such proactive operations could be performed at random times. While the cache flush still occurs, its occurrence is not unexpected and it has now become part of the overall scheduling performed by the scheduler and may be managed in a more effective and intelligent manner. Subsequent to performing this proactive action 232, the system may generally be seen to be in a more predictable state 240. This is because a cache flush was scheduled and performed on the device and the likelihood of the device spontaneously initiating an internal cache flush on its own is reduced (i.e., its cache has already been flushed). By combining both reactive and proactive actions or operations within the model, greater system predictability may be achieved and improved scheduling may likewise be achieved.

Referring now to FIG. 3, one embodiment of a method 300 for performing I/O scheduling to reduce unpredicted behaviors is shown. The components embodied in network architecture 100 and data storage arrays 120*a*-120*b* described above may generally operate in accordance with method 300. The steps in this embodiment are shown in sequential order. However, some steps may occur in a different order than shown, some steps may be performed concurrently, some steps may be combined with other steps, and some steps may be absent in another embodiment.

In block 302, an I/O scheduler schedules read and write operations for one or more storage devices. In various embodiments, the I/O scheduler may maintain a separate queue (either physically or logically) for each storage device. In addition, the I/O scheduler may include a separate queue for each operation type supported by a corresponding storage device. For example, an I/O scheduler may maintain at least a separate read queue and a separate write queue for an SSD. In block 304, the I/O scheduler may monitor the behavior of the one or more storage devices. In one embodiment, the I/O scheduler may include a model of a corresponding storage device (e.g., a behavioral type model and/or algorithms based at least in part on a model of the device) and receive state data from the storage device to input to the model. The model within the I/O scheduler may both model and predict behavior of the storage device by utilizing known and/or observed characteristics of the storage device.

The I/O scheduler may detect characteristics of a given storage device which affect, or may affect, I/O performance. For example, as will be discussed further below, various characteristics and states of devices, and of I/O traffic, may be maintained. By observing these characteristics and states, the I/O scheduler may predict that a given device may soon enter a state wherein it exhibits high I/O latency behavior. For example, in one embodiment, the I/O scheduler may detect or predict that an internal cache flush is about to occur within a storage device which may affect the response times of requests to the storage device. For example, in one embodiment, a storage device that sits idle for a given amount of time may flush its internal cache. In some embodiments, whether a given device is idle may be based on a perspective external to the device. For example, if an operation has not been scheduled for a device for a period of time, the device may be deemed to be idle for approximately that period of time. In such an embodiment, the device could in fact be busy based on internally initiated activity within the device. However, such internally initiated activity would not be considered in determining whether the device is idle. In other embodiments, internally initiated activities of a device could be considered when determining whether a device is idle or busy. By observing the behavior of the device, and noting it has been idle for a given amount of time, the scheduler may predict when an internal cache flush might occur. In other embodiments, the scheduler may also have the ability to poll devices to determine various states or conditions of the devices. In any event, the scheduler may be configured to determine the potential for unscheduled behaviors such as internal cache flushes and initiate a proactive operation in order to prevent the behavior from occurring. In this manner, the scheduler controls the timing of events in the device, and the system, and is better able to schedule operations.

Various characteristics may be used to as a basis for making predictions regarding device behavior. In various embodiments, the scheduler may maintain a status of currently pending operations and/or a history of recent operations corresponding to the storage devices. In some embodiments, the I/O scheduler may know the size of a cache within a device and/or the caching policies and maintain a count of a number of write requests sent to the storage device. In other embodiments, other mechanisms may be available for determining the state of a cache within a device (e.g., direct polling type access to the device). In addition, the I/O scheduler may track the amount of data in write requests sent to the storage device. The I/O scheduler may then detect when either a number of write requests or a total amount of data corresponding to the write requests reaches a given threshold. If the I/O scheduler detects such a condition (conditional block 306), then in block 308, the I/O scheduler may schedule a particular operation for the device. Such an operation may generally correspond to the above described proactive operations. For example, the I/O scheduler may place a cache flush command in a corresponding queue to force the storage device to perform a cache flush at a time of the scheduler's choosing. Alternatively, the I/O scheduler may place a dummy read operation in the queue in order to determine whether or not any cache flush on the storage device has completed. Still further, the scheduler could query a device to obtain status information (e.g., idle, busy, etc.). These and other characteristics and operations are possible and are contemplated. In addition, in various embodiments proactive operations may be scheduled when reconditioning an SSD in place. In such an embodiment, the SSD firmware and/or mapping tables may get into a state where requests hang or are permanently slow. It may be possible to just reset the drive or power the drive off and on to unclog the firmware. However if the condition is permanent (i.e., a bug in the firmware that can't handle the current state of the mapping tables) another way to fix it is to reformat the drive to completely clean and reset the FTL and then repopulate it or reuse it for something other data.

The actions described above may be performed to prevent or reduce a number of occurrences of unpredicted variable response times. Simultaneously, the I/O scheduler may detect the occurrence of any variable behavior of a given storage device at an unpredicted time. If the I/O scheduler detects such a condition (conditional block 310), then in block 312, the I/O scheduler may place an operation in a corresponding queue of the storage device. In this case, the operation may generally correspond to the above described reactive operations. The operation may be used both to reduce the amount of time the storage device provides variable behavior and to detect the end of the variant behavior. In various embodiments, proactive and/or reactive operations may generally include any operation capable of placing a device into (at least in part) a known state. For example, initiating a cache flush operation may result in the device achieving an empty cache state. A device with a cache that is empty may be less likely to initiate an internal cache flush than a device whose cache is not empty. Some examples of proactive and/or reactive operations include cache flush operations, erase operations, secure erase operations, trim operations, sleep operations, hibernate operations, powering on and off, and reset operations.

Referring now to FIG. 4, one embodiment of a method 400 for segregating operations issued to a storage device is shown. The steps in this embodiment are shown in sequential order. However, some steps may occur in a different order than shown, some steps may be performed concurrently, some steps may be combined with other steps, and some steps may be absent in another embodiment. In various embodiments, operations of a first type may be segregated from operations of a second type for scheduling purposes.

For example, in one embodiment operations of a first type may be given scheduling priority over operations of a second type. In such an embodiment, operations of the first type may be scheduled for processing relatively quickly, while operations of the second type are queued for later processing (in effect postponing the processing of the operations). At a given point in time, processing of operations of the first type may be halted while the previously queued operations (of the second type) are processed. Subsequently, processing of the second operation type may again be stopped while processing priority is returned to operations of the first type. When processing is halted for one type and begins for another type may be based upon periods of time, accumulated data, transaction frequency, available resources (e.g., queue utilization), any combination of the above, or based upon any desired condition as desired.

For random read and write requests, an SSD typically demonstrates better performance than a HDD. However, an SSD typically exhibits worse performance for random write requests than read requests due to the characteristics of an SSD. Unlike an HDD, the relative latencies of read and write requests are quite different, with write requests typically taking significantly longer than read requests because it takes longer to program a Flash memory cell than read it. In addition, the latency of write operations can be quite variable due to additional operations that need to be performed as part of the write. For example, an erase operation may be performed prior to a write or program operation for a Flash memory cell, which is already modified. Additionally, an erase operation may be performed on a block-wise basis. In such a case, all of the Flash memory cells within a block (an erase segment) are erased together. Because a block is relatively large and comprises multiple pages, the operation may take a relatively long time. Alternatively, the FTL may remap a block into an already erased erase block. In either case, the additional operations associated with performing a write operation may cause writes to have a significantly higher variability in latency as well as a significantly higher latency than reads. Other storage device types may exhibit different characteristics based on request type. In addition to the above, certain storage devices may offer poor and/or variable performance if read and write requests are mixed. Therefore, in order to improve performance, various embodiments may segregate read and write requests. It is noted that while the discussion generally speaks of read and write operations in particular, the systems and methods described herein may be applied to other operations as well. In such other embodiments, other relatively high and low latency operations may be identified as such and segregated for scheduling purposes. Additionally, in some embodiments reads and writes may be categorized as a first type of operation, while other operations such as cache flushes and trim operations may be categorized as corresponding to a second type of operation. Various combinations are possible and are contemplated.

In block 402, an I/O scheduler may receive and buffer I/O requests for a given storage device of one or more storage devices. In block 404, low-latency I/O requests may generally be issued to the storage device in preference to high latency requests. For example, depending on the storage technology used by the storage devices, read requests may have lower latencies than write requests and other command types and may issue first. Consequently, write requests may be accumulated while read requests are given issue priority (i.e., are conveyed to the device ahead of write requests). At some point in time, the I/O scheduler may stop issuing read requests to the device and begin issuing write requests. In one embodiment, the write requests may be issued as a stream of multiple writes. Therefore, the overhead associated with a write request may be amortized over multiple write requests. In this manner, high latency requests (e.g., write requests) and low latency requests (e.g., read requests) may be segregated and handled separately.

In block 406, the I/O scheduler may determine whether a particular condition exists which indicates high latency requests should be conveyed to a device(s). For example, in one embodiment detecting such a condition may comprise detecting a given number of high latency I/O requests, or an amount of corresponding data, has accumulated and reached a given threshold. Alternatively, a rate of high latency requests being received may reach some threshold. Numerous such conditions are possible and are contemplated. In one embodiment, the high-latency requests may be write requests. If such a condition occurs (conditional block 408), then in block 410, the I/O scheduler may begin issuing high-latency I/O requests to the given storage device. The number of such requests issued may vary depending upon a given algorithm. The number could correspond to a fixed or programmable number of writes, or an amount of data. Alternatively, writes could be issued for a given period of time. For example, the period of time may last until a particular condition ceases to exist (e.g., a rate of received writes falls), or a particular condition occurs. Alternatively, combinations of any of the above may be used in determining when to begin and when to stop issuing high latency requests to the device(s). In some embodiments, the first read request after a stream of write requests may be relatively slow compared to other read requests. In order to avoid scheduling a "genuine" read requests in the issue slot immediately following a stream of write requests, the I/O scheduler may be configured to automatically schedule a "dummy" read following the stream of write requests. In this context a "genuine" read is a read for which data is requested by a user or application, and a "dummy" read is an artificially created read whose data may simply be discarded. In various embodiments, until the dummy read is detected as finished, the write requests may not be determined to have completed. Also, in various embodiments, a cache flush may follow a stream of writes and be used to determine when the writes have completed.

Referring now to FIG. 5, one embodiment of a method 500 for developing a model to characterize the behavior of storage devices in a storage subsystem is shown. The steps in this embodiment are shown in sequential order. However, some steps may occur in a different order than shown, some steps may be performed concurrently, some steps may be combined with other steps, and some steps may be absent in another embodiment.

In block 502, one or more storage devices may be selected to be used in a storage subsystem. In block 504, various characteristics for each device may be identified such as cache sizes, typical read and write response times, storage topology, an age of the device, and so forth. In block 506, one or more characteristics which affect I/O performance for a given storage device may be identified.

In block 508, one or more actions which affect the timing and/or occurrences of the characteristics for a given device may be determined. Examples may include a cache flush and execution of given operations such as an erase operation for an SSD. For example, a force operation such as a cache flush may reduce the occurrence of variable response times of an SSD at unpredicted times. In block 510, a model may be developed for each of the one or more selected devices based on corresponding characteristics and actions. This model may be used in software, such as within an I/O scheduler within a storage controller.

Figure 6:
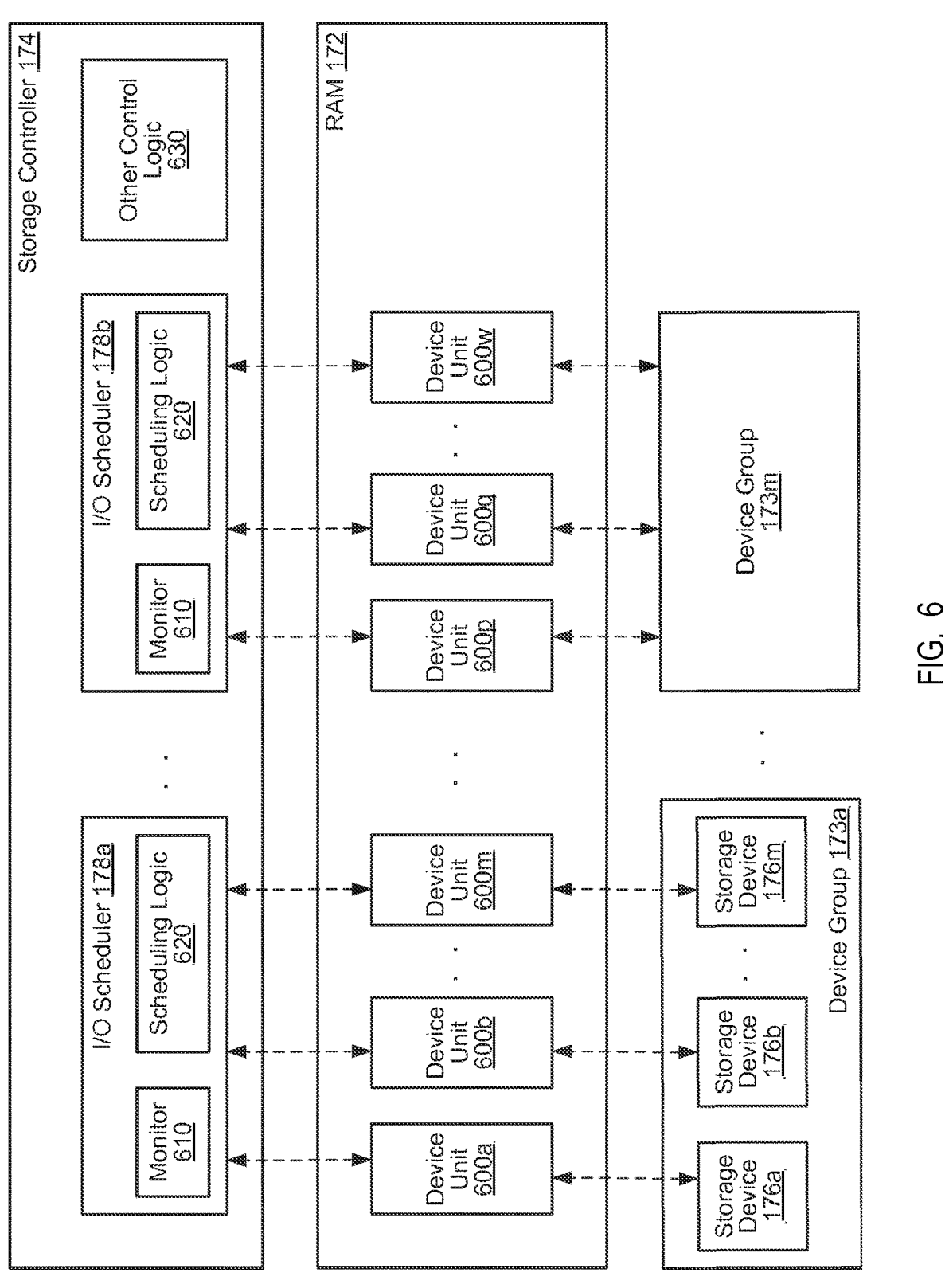
FIG. 6 is a generalized block diagram illustrating one embodiment of a storage subsystem.

Turning now to FIG. 6, a generalized block diagram of one embodiment of a storage subsystem is shown. In the embodiment shown, each of the storage devices 176a-176m are shown within a single device group. However, in other embodiments, one or more storage devices 176a-176m may be partitioned in two or more of the device groups 173a-173m. One or more corresponding operation queues and status tables for each storage device may be included in the device units 600a-600w. These device units may be stored in RAM 172. A corresponding I/O scheduler 178 may be included for each one of the device groups 173a-173m. Each I/O scheduler 178a or 178b may include a monitor 610 that tracks state data for each of the storage devices within a corresponding device group. Scheduling logic 620 may perform the decision of which requests to issue to a corresponding storage device and determine the timing for issuing requests.

Figure 7:
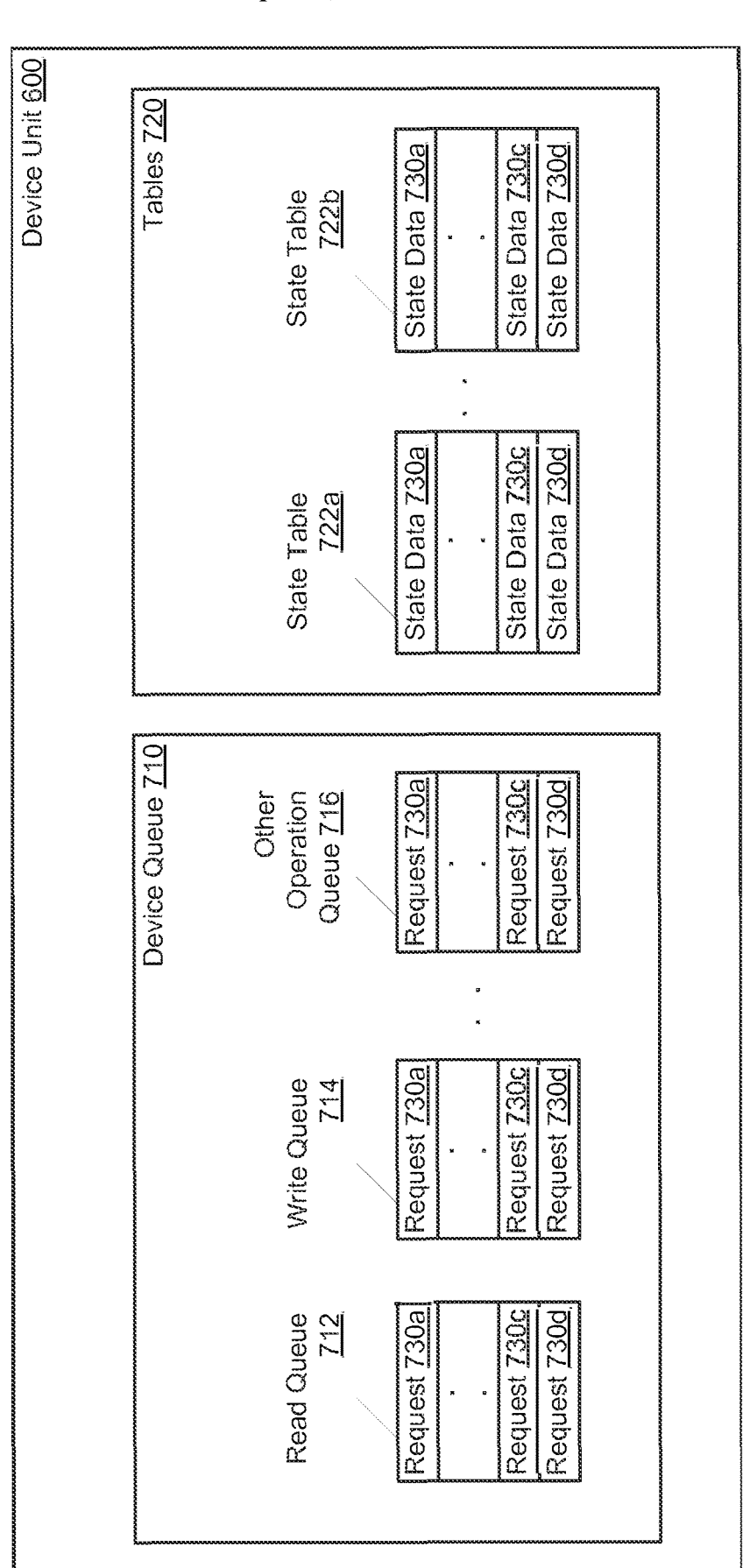
FIG. 7 is a generalized block diagram illustrating another embodiment of a device unit.

Turning now to FIG. 7, a generalized block diagram of one embodiment of a device unit 600 is shown. Device unit 600 may comprise a device queue 710 and tables 720. Device queue 710 may include a read queue 712, a write queue 714 and one or more other queues such as other operation queue 716. Each queue may comprise a plurality of entries 730 for storing one or more corresponding requests. For example, a device unit for a corresponding SSD may include queues to store at least read requests, write requests, trim requests, erase requests and so forth. Tables 720 may comprise one or more state tables 722a-722b, each comprising a plurality of entries 730 for storing state data. In various embodiments, the queues shown in FIG. 7 may be either physically and/or logically separate. It is also noted that while the queues and tables are shown to include a particular number of entries, the entries themselves do not necessarily correspond to one another. Additionally, the number of queues and tables may vary from that shown in the figure. In addition, entries within a given queue, or across queues, may be prioritized. For example, read requests may have a high, medium, or low priority which affects an order within which the request is issued to the device. In addition, such priorities may be changeable depending upon various conditions. For example, a low priority read that reaches a certain age may have its priority increased. Numerous such prioritization schemes and techniques are known to those skilled in the art. All such approaches are contemplated and may be used in association with the systems and methods described herein.

Referring now to FIG. 8, a generalized block diagram illustrating one embodiment of a state table such as that shown in FIG. 7 is shown. In one embodiment, such a table may include data corresponding to state, error, wear level information, and other information for a given storage device. A corresponding I/O scheduler may have access to this information, which may allow the I/O scheduler to better schedule I/O requests to the storage devices. In one embodiment, the information may include at least one or more of a device age 802, an error rate 804, a total number of errors detected on the device 806, a number of recoverable errors 808, a number of unrecoverable errors 810, an access rate of the device 812, an age of the data stored 814, a corresponding cache size 816, a corresponding cache flush idle time 818, one or more allocation states for allocation spaces 820-822, a concurrency level 824, and expected time(s) 826 for various operations. The allocation states may include filled, empty, error and so forth. The concurrency level of a given device may include information regarding the ability of the device to handle multiple operations concurrently. For example, if a device has 4 flash chips and each one is capable of doing one transfer at a time, then the device may be capable of up to 4 parallel operations. Whether or not particular operations may be performed in parallel may depend on how the data was laid out on the device. For example, if the data inside of the device is laid out where the data accessed by a request is all on one chip then operations on that data could proceed in parallel with requests accessing data on different chips. However, if the data accessed by a request is striped across multiple chips, then requests may interfere with one other. Consequently, a device may be capable of a maximum of N parallel/concurrent operations (e.g., 4 in the above described as where the device has 4 chips). Alternatively, the maximum level of concurrency may be based upon the types of operations involved. In any event, stored information indicative of a level of concurrency N, and a number of pending transactions M, may be taken into account by the scheduler when scheduling operations.

Figure 9:
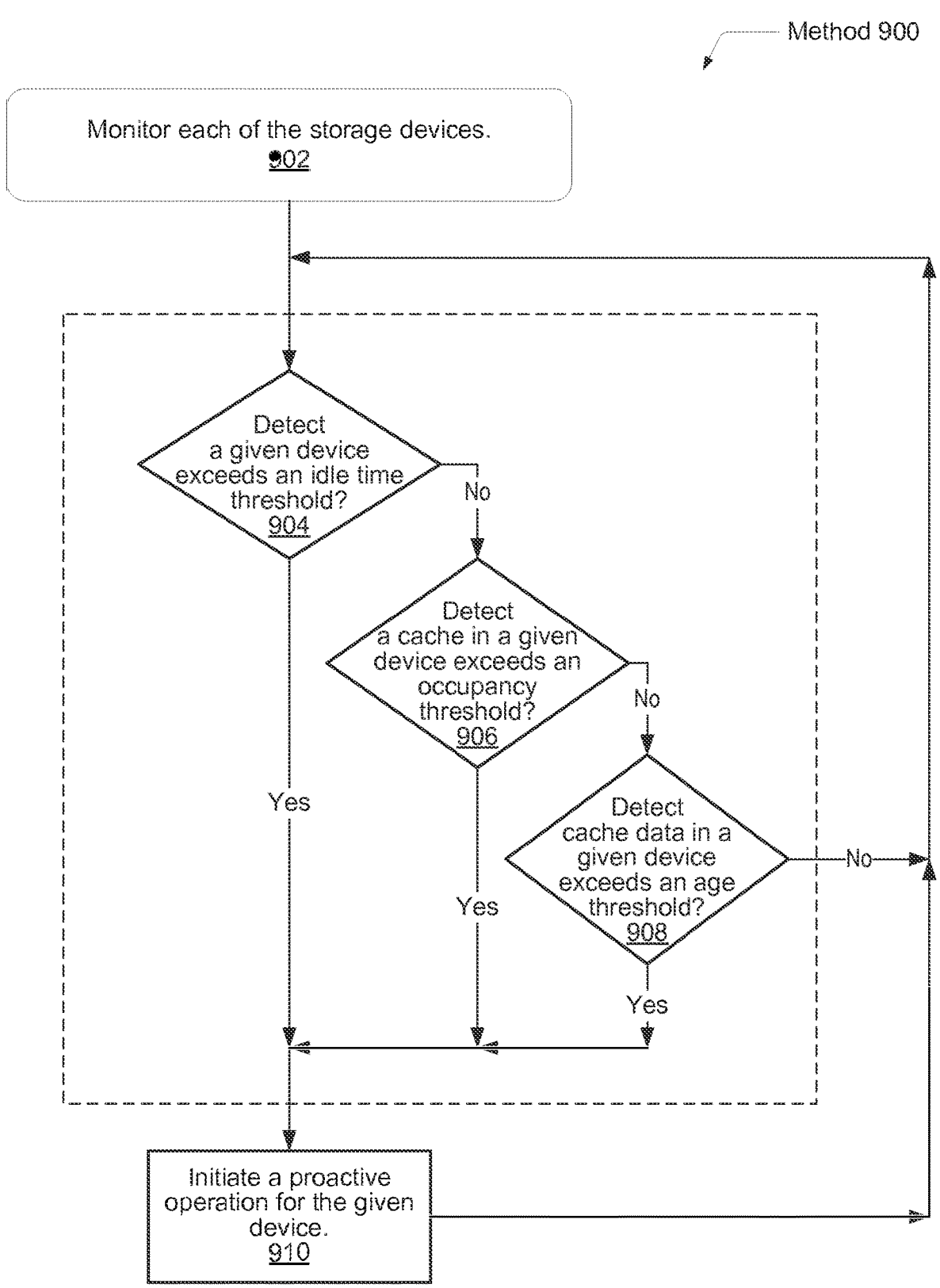
FIG. 9 is a generalized flow diagram illustrating one embodiment of a method for adjusting I/O scheduling to reduce unpredicted variable I/O response times on a data storage subsystem.

Referring now to FIG. 9, another embodiment of a method 900 for adjusting I/O scheduling to reduce unpredicted variable I/O response times on a data storage subsystem is shown. The components embodied in network architecture 100 and data storage arrays 120a-120b described above may generally operate in accordance with method 900. For purposes of discussion, the steps in this embodiment are shown in sequential order. However, some steps may occur in a different order than shown, some steps may be performed concurrently, some steps may be combined with other steps, and some steps may be absent in another embodiment.

In block 902, an I/O scheduler may monitor the behavior of each one of the storage devices. Conditional blocks 904-908 illustrate one embodiment of detecting characteristics of a given device which may affect I/O performance as described above regarding conditional step 306 of method 300. In one embodiment, if the I/O scheduler detects a given device exceeds a given idle time (conditional block 904) or detects a corresponding cache exceeds an occupancy threshold (conditional block 906) or detects a cached data exceeds a data age threshold (conditional block 908), then in block 910, the I/O scheduler may issue a force (proactive) operation to the given storage device. In such a case, the scheduler may predict that an internal cache flush will occur soon and at an unpredictable time. In order to avoid occurrence of such an event, the I/O scheduler proactively schedules an operation to avert the event.

It is noted that aversion of an event as described above may mean the event does not occur, or does not occur at an unpredicted or unexpected time. In other words, the scheduler generally prefers that given events occur according to the scheduler's timing and not otherwise. In this sense, a long latency event occurring because the scheduler scheduled the event is better than such an event occurring unexpectedly. Timers and counters within the scheduling logic 620 may be used in combination with the monitor 610 to perform at least these detections. One example of a force operation issued to the given storage device may include a cache flush. Another example of a force operation may include an erase request. A force operation may be sent from the I/O scheduler to a corresponding queue in the device queue 710 within a corresponding device unit 600 as part of the scheduling.

Figure 10:
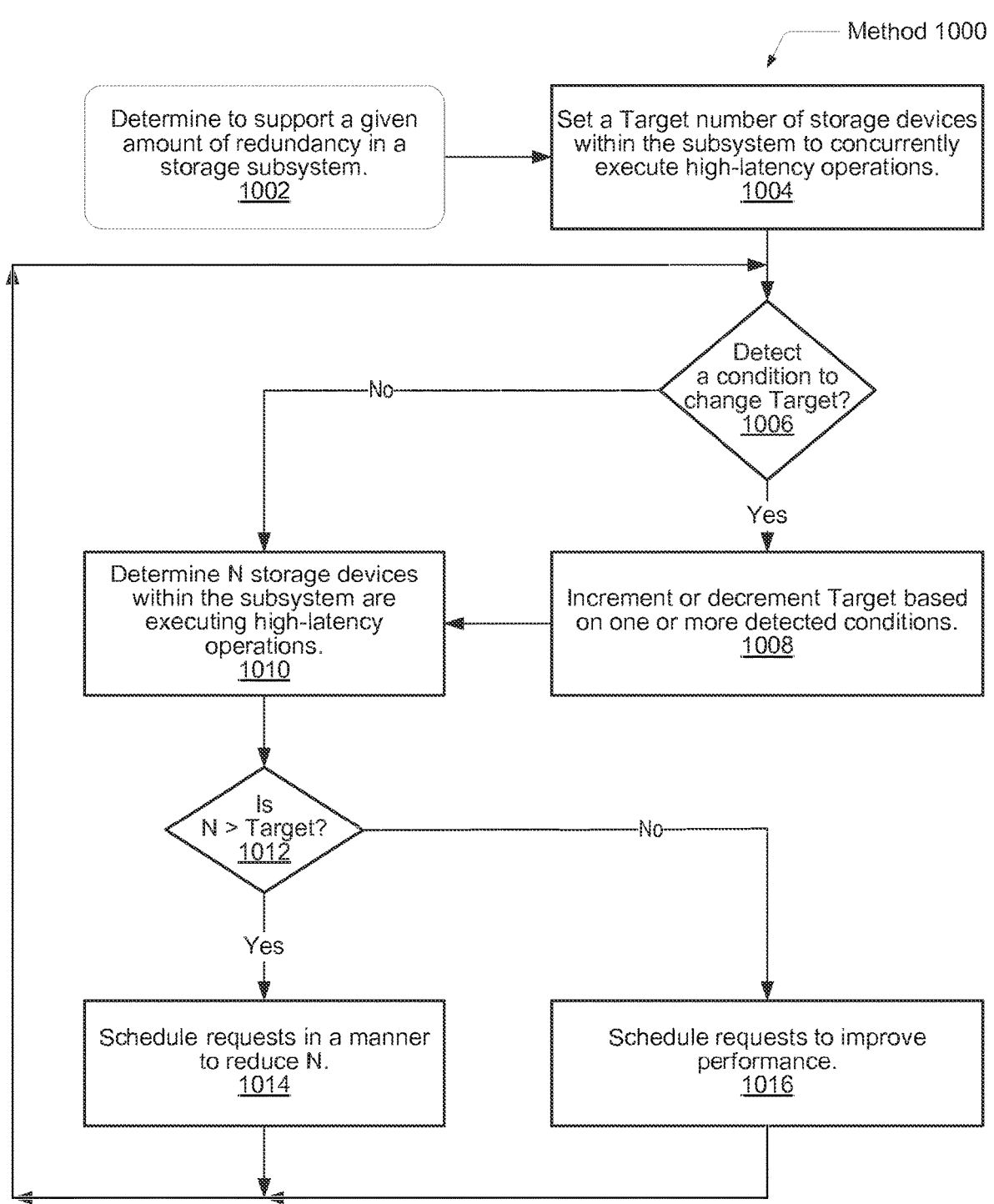
FIG. 10 is a generalized flow diagram illustrating one embodiment of a method for maintaining read operations with efficient latencies on shared data storage.

Referring now to FIG. 10, one embodiment of a method 1000 for maintaining read operations with relatively low latencies on shared data storage is shown. The components embodied in network architecture 100 and data storage arrays 120a-120b described above may generally operate in accordance with method 1000. For purposes of discussion, the steps in this embodiment are shown in sequential order. However, some steps may occur in a different order than shown, some steps may be performed concurrently, some steps may be combined with other steps, and some steps may be absent in another embodiment.

In block 1002, an Amount of redundancy in a RAID architecture for a storage subsystem may be determined to be used within a given device group 173. For example, for a 4+2 RAID group, 2 of the storage devices may be used to store erasure correcting code (ECC) information, such as parity information. This information may be used as part of reconstruct read requests. In one embodiment, the reconstruct read requests may be used during normal I/O scheduling to improve performance of a device group while a number of storage devices are detected to be exhibiting variable I/O response times. In block 1004, a maximum number of devices which may be concurrently busy, or exhibiting variable response time, within a device group is determined. This maximum number may be referred to as the Target number. In one embodiment, the storage devices are SSDs which may exhibit variable response times due to executing write requests, erase requests, or cache flushes. In one embodiment, the target number is selected such that a reconstruct read can still be performed.

In one embodiment, an I/O scheduler may detect a condition which warrants raising the Target number to a level where a reconstruct read is no longer efficient. For example, a number of pending write requests for a given device may reach a waiting threshold (i.e., the write requests have been pending for a significant period of time and it is determined they should wait no longer). Alternatively, a given number of write requests may be detected which have a relatively high-priority which cannot be accumulated for later issuance as discussed above. If the I/O scheduler detects such a condition (conditional block 1006), then in block 1008, the I/O scheduler may increment or decrement the Target based on the one or more detected conditions. For example, the I/O scheduler may allow the Target to exceed the Amount of supported redundancy if an appropriate number of high-priority write requests are pending, or some other condition occurs. In block 1010, the I/O scheduler may determine N storage devices within the device group are exhibiting variable I/O response times. If N is greater than Target (conditional block 1012), then in block 1014, the storage devices may be scheduled in a manner to reduce N. Otherwise, in block 1016, the I/O scheduler may schedule requests in a manner to improve performance. For example, the I/O scheduler may take advantage of the capability of reconstruct read requests as described further below.

Figure 11:
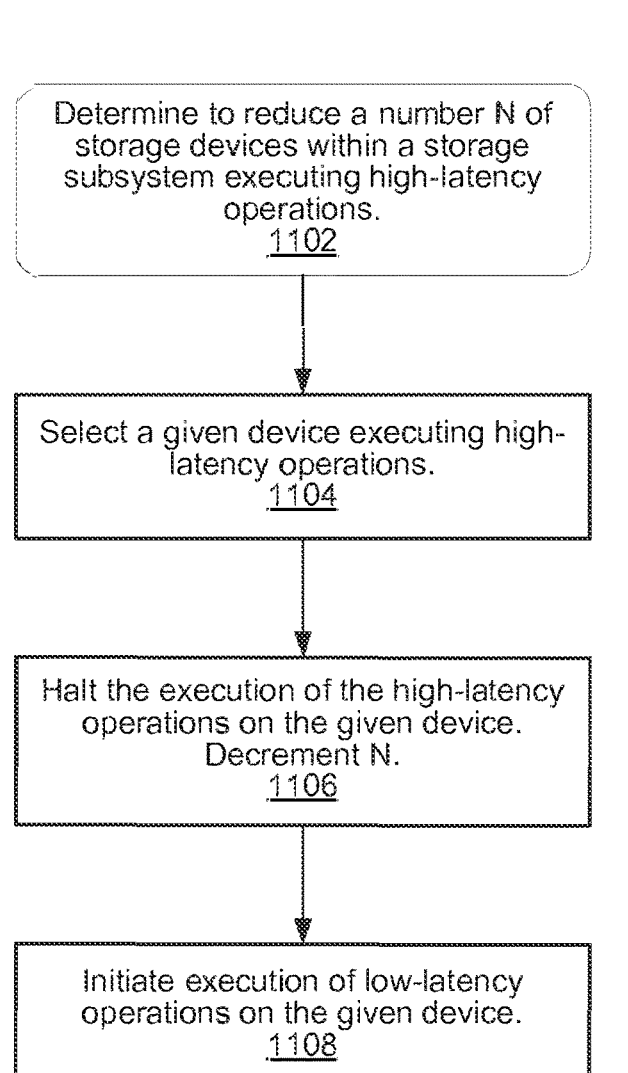
FIG. 11 is a generalized flow diagram illustrating one embodiment of a method for reducing a number of storage devices exhibiting variable I/O response times.

Referring now to FIG. 11, one embodiment of a method 1100 for reducing a number of storage devices exhibiting variable I/O response times is shown. The steps in this embodiment are shown in sequential order. However, some steps may occur in a different order than shown, some steps may be performed concurrently, some steps may be combined with other steps, and some steps may be absent in another embodiment.

In block 1102, an I/O scheduler may determine to reduce a number N of storage devices within a storage subsystem executing high-latency operations which cause variable response times at unpredicted times. In block 1104, the I/O scheduler may select a given device executing high-latency operations. In block 1106, the I/O scheduler may halt the execution of the high-latency operations on the given device and decrement N. For example, the I/O scheduler may stop issuing write requests and erase requests to the given storage device. In addition, the corresponding I/O scheduler may halt execution of issued write requests and erase requests. In block 1108, the I/O scheduler may initiate execution of low-latency operations on the given device, such as read requests. These read requests may include reconstruct read requests. In this manner, the device leaves a long latency response state and N is reduced.

Figure 12:
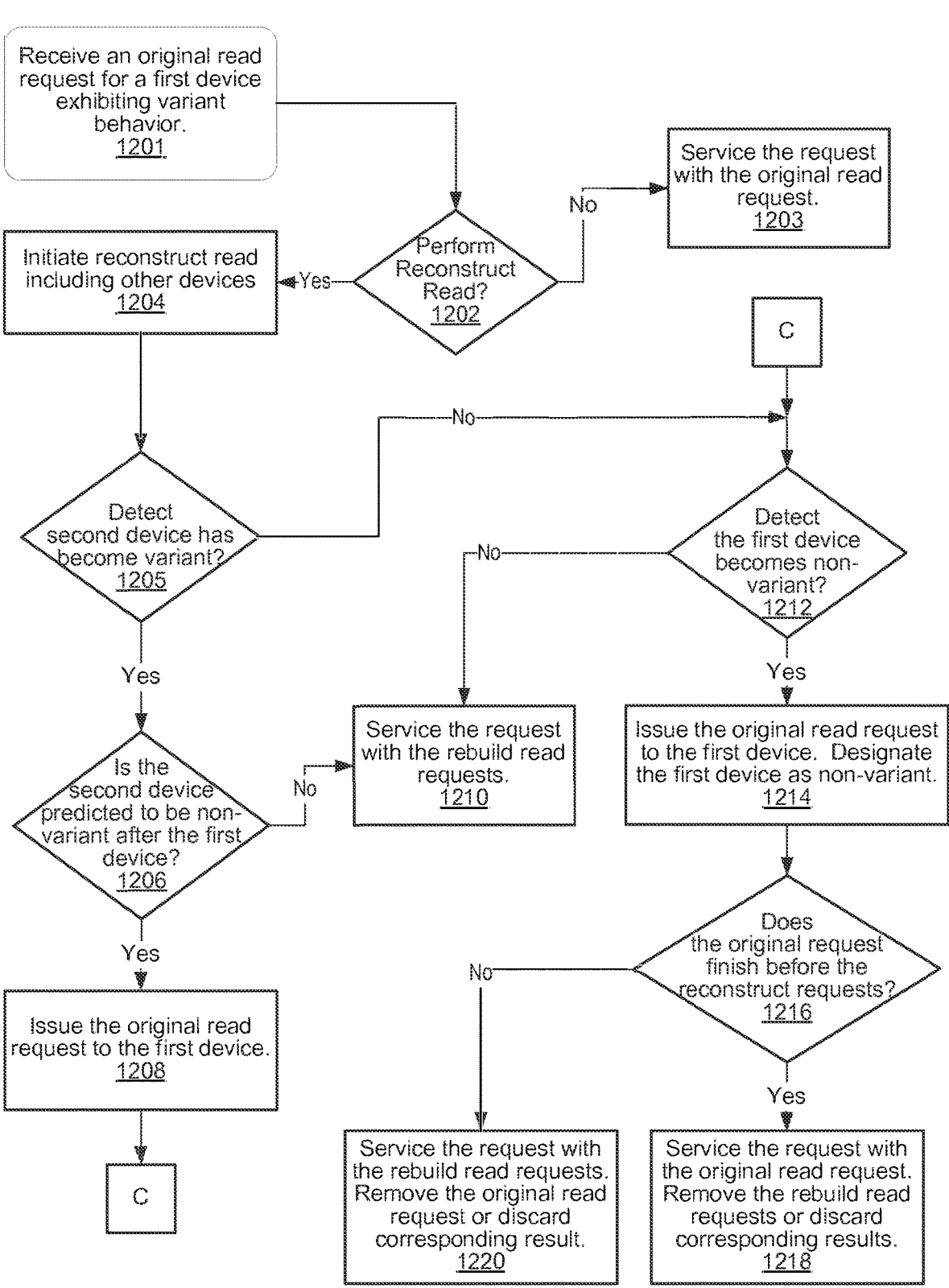
FIG. 12 is a generalized flow diagram illustrating one embodiment of a method for maintaining read operations with efficient latencies on shared data storage.

Turning now to FIG. 12, one embodiment of a method for maintaining read operations with efficient latencies on shared data storage is shown. The components embodied in network architecture 100 and data storage arrays 120*a*-120*b* described above may generally operate in accordance with the method. For purposes of discussion, the steps in this embodiment are shown in sequential order. However, some steps may occur in a different order than shown, some steps may be performed concurrently, some steps may be combined with other steps, and some steps may be absent in another embodiment.

The method of FIG. 12 may represent one embodiment of steps taken to perform step 1016 in method 1000. In block 1201, an I/O scheduler receives an original read request directed to a first device that is exhibiting variable response time behavior. The first device may be exhibiting variable response times due to receiving a particular scheduled operation (i.e., a known reason) or due to some unknown reason. In various embodiments what is considered a variable response time may be determined based at least in part on an expected latency for a given operation. For example, based upon characteristics of a device and/or a recent history of operations, a response to a given read may be expected to occur within a given period of time. For example, an average response latency could be determined for the device with a delta determined to reflect a range of acceptable response latencies. Such a delta could be chosen to account for 99% of the transactions, or any other suitable number of transactions. If a response is not received within the expected period of time, then initiation of a reconstruct read may be triggered.

Generally speaking, whether or not a reconstruct read is imitated may be based upon a cost benefit analysis which compares the costs associated with performing the reconstruct read with the (potential) benefits of obtaining the results of the reconstruct read. For example, if a response to an original read request in a given device is not received within a given period of time, it may be predicted that the device is performing an operation that will result in a latency that exceeds that of a reconstruct read were one to be initiated. Therefore, a reconstruct read may be initiated. Such an action may be taken to (for example) maintain a given level of read service performance. It is noted that other factors may be considered as well when determining whether to initiate a reconstruct read, such as current load, types of requests being received, priority of requests, the state of other devices in the system, various characteristics as described in FIGS. 7 and 8, and so on. Further, it is noted that while a reconstruct read may be initiated due to a relatively long response latency for the original read, it is expected that the original read request will in fact complete. In fact both the original read and the reconstruct read may successfully complete and provide results. Consequently, the reconstruct read is not required in order for the original request to be serviced. This is in contrast to a latency that is due to an error condition, such as detecting a latency and some indication of an error that indicates the transaction will (or may) not complete successfully. For example, a device timeout due to an inability to read a given storage location represents a response which is not expected to complete. In such cases, a reconstruct read may be required in order to service the request. Accordingly, in various embodiments the system may effectively include at least two timeout conditions for a given device. The first timeout corresponds to a period of time after which a reconstruct read may be initiated even though not necessarily required. In this manner, reconstruct reads may be incorporated into the scheduling algorithms as a normal part of the non-error related scheduling process. The second timeout, occurring after the first timeout, represents a period of time after which an error condition is believed to have occurred. In this case a reconstruct read may also be initiated due to an expectation that the original read will not be serviced by the device indicating the error.

In view of the above, the I/O scheduler may then determine whether a reconstruct read corresponding to the original read is to be initiated (decision block 1202). The reconstruct read would generally entail one or more reads serviced by devices other than the first device. In determining whether a reconstruct read is to be initiated, many factors may be taken into account. Generally speaking, the I/O scheduler engages in a cost/benefit analysis to determine whether it may be "better" to attempt to service the original read with the first device, or attempt to service the original read by issuing a reconstruct read. As discussed above a number of factors may be considered when determining whether to initiate a reconstruct read. What is "better" in a given situation may vary, may be programmable, and may be determined dynamically. For example, an algorithm may be such that it always favors faster read response times. In such a case, a determination may be made as to whether servicing of the reconstruct read can (or may) complete prior to servicing of the original read by the original device. Alternatively, an algorithm may determine that a reduced system load is favored at a given time. In such a case, the I/O scheduler may choose not to initiate a reconstruct read with its additional overhead—even if the reconstruct read may complete faster than the original read. Still further, a more nuanced balancing of speed versus overhead may be used in such determinations. In various embodiments, the algorithm may be programmable with an initial weighting (e.g., always prefer speed irrespective of loading). Such a weighting could be constant, or could be programmable to vary dynamically according to various conditions. For example, conditions could include time of day, a rate of received I/O requests, the priority of received requests, whether a particular task is detected (e.g., a backup operation is currently being performed), detection of a failure, and so on.

If the scheduler decides not to initiate a reconstruct read, then the read may be serviced by the originally targeted device (block 1203). Alternatively, a reconstruct read may be initiated (block 1204). In one embodiment, the other devices which are selected for servicing the reconstruct read are those which are identified as exhibiting non-variable behavior. By selecting devices which are exhibiting non-variable behavior (i.e., more predictable behavior), the I/O scheduler is better able to predict how long it may take to service the reconstruct read. In addition to the given variable/non-variable behavior of a device, the I/O scheduler may also take in to consideration other aspects of each device. For example, in selecting a particular device for servicing a reconstruct read, the I/O scheduler may also evaluate a number of outstanding requests for a given device (e.g., how full is the device queue), the priority of requests currently pending for a given device, the expected processing speed of the device itself (e.g., some devices may represent an older or otherwise inherently slower technology than other devices), and so on. Further, the scheduler may desire to schedule the reconstruct read in such a way that the corresponding results from each of the devices is returned at approximately the same time. In such a case, the scheduler may disfavor a particular device for servicing a reconstruct read if it is predicted its processing time would differ significantly from the other devices—even if it were much faster than the other devices. Numerous such factors and conditions to consider are possible and are contemplated.

In one embodiment, the reconstruct read requests may inherit a priority level of the original read request. In other embodiments, the reconstruct read requests may have priorities that differ from the original read request. If the I/O scheduler detects a selected second (other) device receiving a corresponding reconstruct read request is now exhibiting variable response time behavior (conditional block 1205) and this second device is predicted to remain variable until after the first device is predicted to become non-variable (conditional block 1206), then in block 1208, the I/O scheduler may issue the original read request to the first device. In one embodiment, timers may be used to predict when a storage device exhibiting variable response times may again provide non-variable response times. Control flow of method 1200 moves from block 1208 to conditional block 1212 via block C. If the second device is not predicted to remain variable longer than the first device (conditional block 1206), then control flow of method 1200 moves to block 1210. In block 1210, the read request is serviced by the issued reconstruct read requests.

If the I/O scheduler detects the given variable device becomes non-variable (conditional block 1212), then in block 1214, the I/O scheduler issues the original read request to the given device. The I/O scheduler may designate the given device as non-variable and decrement N (the number of storage devices detected to provide variable I/O response times). If the original read request finishes before the alternate reconstruct read requests (conditional block 1216), then in block 1218, the I/O scheduler services the read request with the original read request. In various embodiments, the scheduler may remove the rebuild read requests. Alternatively, the reconstruct read requests may complete and their data may simply be discarded. Otherwise, in block 1220, the I/O scheduler services the read request with the reconstruct read requests and may remove the original read request (or discard its returned data).

FIG. 13 sets forth a flow chart illustrating an example method of efficient execution of I/O operations in a storage environment. The example method depicted in FIG. 13 may be implemented using one or more components of data storage arrays 120a or 120b. For example, in some embodiments, the example method depicted in FIG. 13 may be implemented by components of storage subsystem 170, such as storage array controller 174. The logic of the method of FIG. 13 may be included in one or more of a base operating system (OS) 116, a file system 140, one or more I/O schedulers 178a or 178b within a storage array controller 174, control logic within each of the storage devices 176a-176m, or otherwise. Additionally, the logic, algorithms, and control mechanisms described herein may comprise hardware and/or software.

The example method depicted in FIG. 13 includes receiving 1302, by a storage controller, an incoming I/O operation that can be serviced by a storage device while at least one pending operation is to be processed using the storage device. Receiving 1302, by a storage controller, an incoming I/O operation that can be serviced by a storage device while at least one pending operation is to be processed using the storage device can be carried out by a scheduler component of storage array controller 174, where the I/O operation can be serviced by any of storage devices 176a-m, for example. When an I/O operation is received and directed to a storage device, storage array controller 174 can determine that at least one other operation is pending processing using the storage device.

Receiving 1302, by a storage controller, an incoming I/O operation can include receiving from client computer systems 110a-c. The incoming I/O operation can be, for example, an operation to read or modify data. At around the time that the incoming I/O operation is received, one or more pending operations may be pending processing. More specifically, these pending operations may have to be processed by the same storage device as the storage device to which the incoming I/O operation is directed. Readers will appreciate that the processing of an incoming I/O operation (or even an internal operation) can result in different operation times and thus efficiency values based on the presence of pending operations and/or the particular nature of the pending operations that are to be processed when the incoming I/O operation is received.

In one embodiment, the pending operation may be, for example, another I/O operation like a read operation or a write operation that was previously received from client computer systems 110a-c. In another embodiment, the pending operation may also be an internal operation, such as a background read operation. Background read operations can be involved in processes such as, for example, data refresh operations, garbage collection operations, space adjustment operations, or the like.

Readers will appreciate that operations to be processed by storage devices may be scheduled by a scheduler component, such as a scheduler component of storage array controller 174. Storage array controller 174 may be configured to schedule or queue operations (e.g., read operations, write operations, or other internal operations) for each of storage devices 176a-m. Storage array controller 174 may include, for example, a die-aware scheduler that has an awareness of how die or parts of die (such as erase blocks or planes) within storage devices 176a-m are split into categories. For example certain die or parts of die within a storage device may be programmed in SLC flash mode and certain other die or parts of die may be programmed in QLC flash mode. Using such information and an understanding that SLC writes can be faster than QLC writes, storage array controller 174 can be configured to schedule operations for maximum efficiency. Efficiency, as used herein, can refer to latency reduction, throughput optimization, satisfaction of some external criteria like a service level agreement or policy, or the like.

The example method depicted in FIG. 13 also includes determining 1304, based on an analysis by the storage controller of an operational state of a storage system that includes the storage device, whether processing the at least one pending operation is more efficient than issuing an alternative operation to the storage device.

Determining whether processing a pending operation is more efficient relative to an alternative operation that achieves the same result can encompass several scenarios. For example, processing of the alternative operation may be faster than the pending operation, regardless of other constraints. The alternative operation may take a similar or same amount of time to complete, yet overall efficiency may be improved by executing the alternative operation because executing the alternative operation allows the incoming operation to be completed more quickly even if there are no constraints on when the incoming operation should complete. Similarly, there may be constraints on completion of the incoming operation, such as that the incoming operation should be completed within a maximum time or latency. In such a scenario, executing the alternative operation may be more efficient in that it achieves the same result (e.g., a reconstruct read that produces the same data that a read operation requested) while the incoming operation still completes within its constraints, whereas executing the originally pending operation might delay completion of the incoming operation, or it may be the case that the incoming operation can complete within constraints only if the pending operation is delayed which may be undesirable or unnecessary given that executing the alternative operation is a possibility and can achieve greater efficiency.

Efficiency can also be defined in terms of the likelihood of or the number of possible errors that may occur during execution. For example, storage array controller 174 may be aware that given a particular interplay of operations (e.g., incoming write plus slow pending read), a greater possibility of errors exists compared to an alternative operational scheduling (e.g., executing reconstruct read in presence of incoming write). As a result, storage array controller 174 can determine that even if other efficiency considerations (e.g., latency) are similar, the alternative operation should still be executed due to a lower likelihood of errors or other conditions that would lower overall efficiency.

Determining 1304, based on an analysis by the storage controller of an operational state of a storage system that includes the storage device, whether processing the at least one pending operation is more efficient than issuing an alternative operation to the storage device can be carried out by storage array controller 174 using various types of information, awareness, or knowledge about the operational state of a storage device in order to devise the optimal or most efficient scheduling of operations. These categories of information can encompass various aspects, such as current system load, read response times, additional overhead at one or more storage devices, one or more types of requests being received, priority of requests being received, or a state of other storage devices within the storage system. These categories of information can also include knowledge of distribution of data across die or across storage devices, knowledge of types of flash programming in use at a storage device, hints regarding scheduling priority for an operation that are provided with the operation or using another mechanism, known constraints on scheduling (e.g., whether a type of operation can be interrupted or not, whether an operation must complete with a certain latency, etc.) and so on.

In one embodiment, the information used by storage array controller 174 can include an awareness of the type of flash memory to which a write operation is directed. For example, the write may be directed to flash memory programmed as SLC flash or as QLC flash or as another type of flash memory programming. Writes directed to SLC flash may be faster than writes directed to QLC flash. In some embodiments, storage array controller 174 may have knowledge of the distribution of SLC flash vs. QLC flash in a particular die, particular storage device, or across different storage devices of storage devices 176a-m, or a flash memory may support multiple programming modes and storage array controller 174 may have knowledge of which operations will program particular flash memories in particular modes. Storage array controller 174's knowledge of internal details of a storage device can be obtained using, for example, probe operations that are supported by a particular storage device of storage devices 176a-m. For example, one or more storage devices 176a-m may support probe operations that can be used to determine the distribution or programmability of SLC flash vs. QLC flash in a flash die, as well as the status of a flash die, or to get a map of parts of a device that are busy. Additionally, such probe operations can also indicate when in-progress slow operations are likely to complete and a number of times a slow operation can still be interrupted while still remaining within limitations of the chip architecture. For example, some chips have limits on a combination of number of interrupts of a flash operation and a maximum time to resume and complete an operation, depending on the type of operation. For example, commonly such limits apply to large writes and erase operations.

Relatedly, storage array controller 174 may also have information regarding the distribution of data across die within a storage device. For example, readers will appreciate that in a system involving zone drives, the system utilizing a storage device likely does not have a full understanding of the layout of flash die within the storage device, as the mapping from a zone address to a particular erase block on a particular plane on a particular die is dynamic and is managed by the SD's internal controller. However, in other embodiments related to zone groups, a Zoned Namespace implementation could be extended to support small groups of zones (e.g., in the range of 4 to 16 sequentially numbered zones) that may be guaranteed to be allocated to die in such a way that each zone will be on a separate die. As such, storage array controller 174 may be able to schedule writes in sequential waves, where a set of sequential zones within the zone groups is written one after another, such that at most one zone will be busy in the group at a time.

In some embodiments, storage array controller 174 may also be aware of erase block actions that can take place within one or more of storage devices 176a-m. For example, storage array controller 174 may have knowledge of flash geometry within a storage device and use this knowledge to redirect operations to flash die that are less busy or that are not known to be a target for concurrent or upcoming read requests. Storage array controller 174 may be, for example, aware that in some cases, a number of segments are allocated as shards matched to erase blocks on a storage device. When a write operation is to be processed, the segment to write data to for that write operation can be chosen. More specifically, the segment can be chosen at the time that it is known what concurrent reads there are. Once concurrent reads for data of the storage device are known, storage array controller 174 can select the segment (to write data to for the write operation) that is not going to be the target of a read request, either at a current time or in a near future time, either by knowing the queue or, for example, by monitoring for read-ahead behaviors.

Moreover, storage array controller 174 can be configured to categorize read operations and/or write operations based on time durations and treat the categorized or batched set of operations together if they also target the same erase block. In other words, a batch of reads or a batch of writes that target a certain erase block can be considered together when determining which erase block to select for processing a write request.

In some embodiments, storage array controller 174 can schedule operations with knowledge of one or more constraints. Certain constraints on scheduling may exist due to storage device configurations. For example, for some storage devices, only one operation per die may be executable at a time. As another example, storage devices may have operational limits on a number of operations per storage device (e.g., 100 operations per drive at a time) that may exist for various reasons. Given such constraints, storage array controller 174 can determine whether processing at least one pending operation is more efficient than issuing an alternative operation to the storage device. For example, if a read operation is pending when an incoming I/O operation (e.g., a write operation) is received storage array controller 174 can determine that the operational limit on the number of operations that can be issued to a storage device has been reached. In response, storage array controller 174 can determine that instead of allowing the pending read to proceed, an alternative operation can be issued to obtain the same data that is requested by the read. For example, storage array controller 174 can determine that a reconstruct read operation should be issued because a reconstruct read, rather than tying up the single storage device whose limit has been reached, uses data from multiple storage devices to reconstruct the requested read data.

There may be additional constraints, such as that specific types of operations have a latency that is not reducible beyond a certain level. For example, for QLC writes, a QLC write to certain pages of a block (e.g., the last few pages) can take on the order of ~60 ms, even as QLC writes to other sections may take on the order of ~10 ms. Additional constraints may exist due to other elements of the storage system. For example, an authority component (not shown) may operate to determine how operations will proceed against particular logical elements of a logical address space of the storage device. Each of the logical elements may be operated on through a particular authority across a plurality of storage controllers of a storage system. Authorities may communicate with one or more storage controllers so that the storage controllers collectively perform operations against those particular logical elements. Such authorities can impose additional constraints, such as that user-visible read operations are not to be queued behind, for example, a 60 ms QLC write. Given knowledge of these additional constraints, storage array controller 174 can determine that alternative operations (e.g., reconstruct read operations) should be executed instead of pending operations (e.g., read I/O operations) in order to service operation processing requests within the abovementioned constraints.

Since SLC writes may be faster than QLC writes, storage array controller 174 may determine that if a write is, for example, directed to SLC flash, then a queued or subsequent read operation can be allowed to wait until the write completes since the SLC write may complete within an acceptable amount of time to allow the read operation to follow it and complete with acceptable latency. By contrast, if a write is a QLC write, storage array controller 174 may determine that if the pending read is forced to wait for the QLC write to complete, the latency for the read will be unacceptable if it follows the write. Based on such a determination, storage array controller 174 may determine to that a read-by-reconstruct operation should be executed to obtain and provide the same data that is requested by the read operation. Using the read-by-reconstruct operation, the requested data can be reconstructed using various storage devices or various different memory locations other than those tied up by the QLC write.

The example method depicted in FIG. 13 includes issuing 1306, by the storage controller, one or more instructions to the storage device. Issuing instructions to the storage device can be carried out, for example, by issuing scheduling instructions to a storage device. Scheduling instructions can include instructions to issue alternative operations instead of currently pending operations. For example, in a scenario where a read operation is received while a write operation is currently pending, storage array controller 174 can determine that an instruction for a reconstruct read operation would be more efficient compared to the pending read operation. Storage array controller 174 can determine that such an instruction should be issued, for example, because as described above, storage array controller 174 can determine that the write operation is likely to complete in an amount of time that will cause a completion time for the read operation to have an unacceptable latency. More specifically, storage array controller 174 can determine that scheduling the pending read operation before proceeding with the incoming write operation will lead to unacceptable latency for the write operation, whereas a reconstruct read can complete more quickly. Based on such a determination, storage array controller 174 can determine that an instruction for a reconstruct read operation would be more efficient in order to obtain and provide the same data that was requested by the pending read operation.

Issuing 1306, by the storage controller, one or more instructions to the storage device can also include issuing one or more hints or indicators, such as a hint to a storage device to interrupt long-running operations. For example, where an incoming operation is received but a pending operation has begun processing, storage array controller 174 can indicate, with the incoming operation, a preference to complete that incoming operation and that any long-running in-progress operations at the storage device can be interrupted in order to allow the incoming operation to complete.

Issuing instructions can include issuing, by storage array controller 174, instructions to suspend and then resume in-progress operations. For example, in certain scenarios, storage array controller 174 can determine that having a QLC read land behind a 60 ms QLC write is unacceptable. Moreover, storage array controller 174's configuration can include information on a storage device's implementation of slow QLC writes. More specifically, for some storage devices, slower QLC writes may be implemented in multiple stages, and in between those stages, storage array controller 174 can poll a queue for whether there are high-priority interrupts that the storage array controller 174 can process. Storage array controller 174 can then insert one or more reads in the high-priority interrupt queue within the storage device. For increased efficiency, storage array controller 174 can ensure that the queue is always filled with reads. Readers will appreciate that this allows the slow QLC write, such as a ~60 ms write to be broken down into multiple steps, thereby allowing multiple opportunities to interrupt or suspect the slow QLC write and schedule in reads. For example, where the slow QLC write is implemented in 5 stages, there may be 4 potential opportunities to execute the reads, thus bringing down the worst-case latency from 60 ms to 12 ms. Relatedly, storage array controller 174 may be configured to suspend an ongoing normal speed QLC write (e.g., a 10-12 ms QLC write) some number of times, thereby suspending and resuming a singular (much more atomic) QLC write and thereby decrease worst-case end-user latency for the operations that land behind such QLC writes to, for example, 3-4 ms instead of 10-12 ms.

Issuing instructions can include issuing, by storage array controller 174, instructions to reduce background operations, thereby freeing up more resources for front-end operations. Readers will appreciate that some amount of background read operational activity may be constant. For example, there may be continuous data refresh, garbage collection, or space adjustment processes being executed in a storage device. In order to decrease frontend read latency, storage array controller 174 may differentiate between frontend and backend operations, and prioritize frontend operations where possible, while ensuring backend operations are still provided at least a minimum level of resources.

Figure 14:
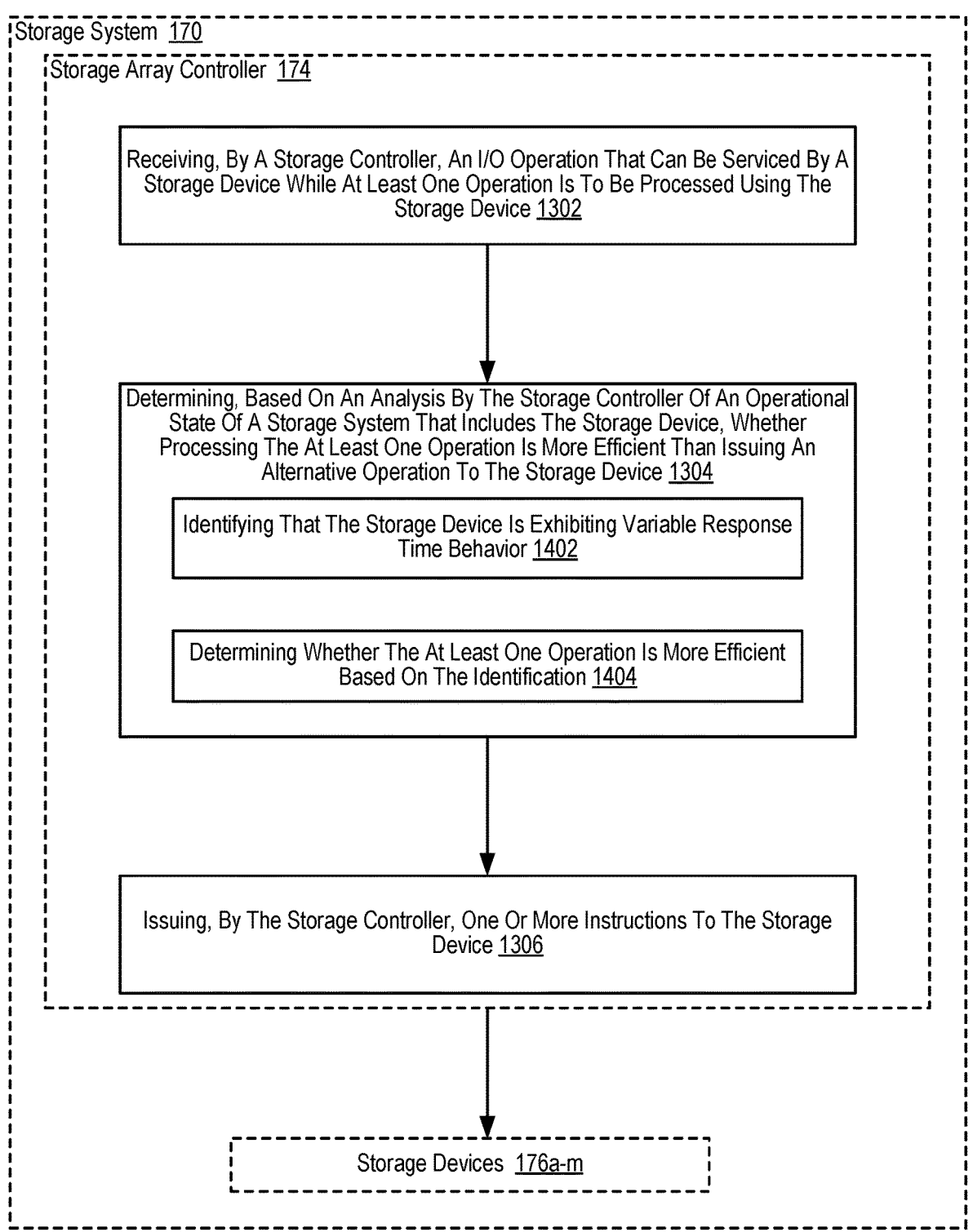
FIG. 14 sets forth a flow chart illustrating an example method of efficient execution of I/O operations in a storage environment.

FIG. 14 sets forth a flow chart illustrating an example method of efficient execution of I/O operations in a storage environment. The example method depicted in FIG. 14 is similar to the example method depicted in FIG. 13, as the example method depicted in FIG. 14 also includes receiving 1302, by a storage controller, an incoming I/O operation that can be serviced by a storage device while at least one pending operation is to be processed using the storage device, determining 1304, based on an analysis by the storage controller of an operational state of a storage system that includes the storage device, whether processing the at least one pending operation is more efficient than issuing an alternative operation to the storage device, and issuing 1306, by the storage controller, one or more instructions to the storage device.

The example method depicted in FIG. 14 differs from the example method of FIG. 13 in that the example method depicted in FIG. 14 also includes identifying 1402 that the storage device is exhibiting variable response time behavior. Identifying 1402 that the storage device is exhibiting variable response time behavior can include determining that a storage device is likely to exhibit variable response times based on an expected latency for one or more operations. For example, based upon characteristics of a device and/or a recent history of operations, a response to a given read may be expected to occur within a given period of time. An average response latency could be determined for the storage device with a delta determined to reflect a range of acceptable response latencies. Such a delta could be chosen to account for 99% of the transactions, or any other suitable number of transactions. In one embodiment, storage array controller 174 receives an original read request directed to a storage device that is exhibiting variable response time behavior. The storage device may be exhibiting variable response times due to receiving a particular scheduled operation (i.e., a pending read operation) or due to some unknown reason.

The example method depicted in FIG. 14 also includes determining 1404 whether the at least one pending operation is more efficient based on the identification. Determining 1404 whether the at least one pending operation is more efficient based on the identification can include determining that, for example, a pending read is (or is not) more efficient than an alternative operation, such as a reconstruct read operation. In a scenario where a storage device is exhibiting variable response time behavior, storage array controller 174 can determine to issue a reconstruct read operation as an alternative to a pending read operation that is interrupted. Alternatively, storage array controller 174 can determine that the pending read operation can be allowed to proceed and a reconstruct read can also be issued, such that both operations are allowed to complete, even where an incoming operation is received (e.g., an incoming write operation).

FIG. 15 sets forth a flow chart illustrating an example method of efficient execution of I/O operations in a storage environment. The example method depicted in FIG. 15 is similar to the example method depicted in FIG. 13, as the example method depicted in FIG. 15 also includes receiving 1302, by a storage controller, an incoming I/O operation that can be serviced by a storage device while at least one pending operation is to be processed using the storage device, determining 1304, based on an analysis by the storage controller of an operational state of a storage system that includes the storage device, whether processing the at least one pending operation is more efficient than issuing an alternative operation to the storage device, and issuing 1306, by the storage controller, one or more instructions to the storage device.

The example method depicted in FIG. 15 differs from the example method of FIG. 13 in that the example method depicted in FIG. 15 also includes determining 1502 that issuing a reconstruct read operation for the data portion is more efficient than the at least one pending operation. Determining 1502 that issuing a reconstruct read operation for the data portion is more efficient than the at least one pending operation can be carried out by storage array controller 174 using different processes. For example, storage array controller 174 can determine, for example, that the data requested by the read operation from one storage device (or one memory area or one die or one segment of the storage device) can be more efficiently obtained using a reconstruct read operation that uses data from different storage devices (or different die or different segments within a storage device). Storage array controller 174 can determine that the obtaining of data portions needed to execute the reconstruct read and the process of executing the reconstruct read (e.g., data calculations such as parity calculations) is faster than would be expected for the pending read operation.

Determining that issuing the reconstruct read operation is more efficient can also include determining that the completion of another operation such as an incoming operation (e.g., an incoming write operation) would be more efficient were the reconstruct read operation issued instead of the pending read operation. Stated differently, storage array controller 174 can determine that the read operation is not latency sensitive or that there are no specific constraints on when and how the read operation completes, yet there are specific constraints on the completion of an incoming write. For example, the incoming write may be latency-sensitive, even if the pending read operation is not. Based on an identification that, for example, certain constraints exist on completion of the incoming write operation, storage array controller 174 can determine that issuing a reconstruct read is more efficient in that the reconstruct read allows the incoming write operation to complete within specific constraints. Even if such constraints do not exist or are not identified, storage array controller 174 can determine that overall latency may be reduced, or some other metric may be improved, if the reconstruct read is issued in preference to completion of the pending read operation in a situation where the incoming write is also received and processed.

The example method depicted in FIG. 15 also includes in response to the determination, issuing 1504 the reconstruct read operation to the storage device. Issuing 1504 the reconstruct read operation to the storage device can include, for example, identifying storage devices that store data that is to be used for processing the reconstruct read and issuing instructions to those storage devices to provide the data portions involved in processing the reconstruct read operation.

In some embodiments, storage array controller 174 can determine that, for example, a read operation can be serviced by storage devices 176a-m through alternative means. Moreover, storage array controller 174 can determine that proceeding with the scheduled operation might be less efficient than the alternative means. For example, storage array controller 174 can determine that an incoming I/O operation (e.g., an incoming write I/O) or even another pending operation, might get blocked behind an excessively slow operation. Readers will appreciate that writes or other operations to a flash die can delay reads for longer periods of time. Storage array controller 174 can recognize that there may be an advantage to convert reads directed to those die into read-by-reconstruct operations where recovery from erasure codes using shards on other flash die or other storage devices can be used in preference to waiting for a delayed read to eventually take place and complete.

FIG. 16 sets forth a flow chart illustrating an example method of efficient execution of I/O operations in a storage environment. The example method depicted in FIG. 16 is similar to the example method depicted in FIG. 13, as the example method depicted in FIG. 16 also includes receiving 1302, by a storage controller, an incoming I/O operation that can be serviced by a storage device while at least one pending operation is to be processed using the storage device, determining 1304, based on an analysis by the storage controller of an operational state of a storage system that includes the storage device, whether processing the at least one pending operation is more efficient than issuing an alternative operation to the storage device, and issuing 1306, by the storage controller, one or more instructions to the storage device.

The example method depicted in FIG. 16 differs from the example method of FIG. 13 in that the example method depicted in FIG. 16 also includes determining 1602 that delaying the at least one pending operation and issuing the alternative operation before issuing the at least one pending operation is more efficient than executing the at least one pending operation without a delay.

Determining 1602 that delaying the at least one pending operation and issuing the alternative operation before issuing the at least one pending operation is more efficient than executing the at least one pending operation without a delay can include delaying pending operations to issue alternative operations while other incoming operations are being received. Delaying a pending operation can include determining that, for example, a read operation that should complete reasonably quickly, but not as quickly as possible, can be delayed for some short period of time to see if further read operations are received against the same segment of a storage device (e.g., the same flash die). Moreover, storage array controller 174 can delay read operations that are considered not latency-sensitive until the storage device is not busy with performing slower operations. Delaying a pending operation and issuing an alternative operation can include delaying a read operation and issuing a reconstruct read operation. Delaying a pending operation can include delaying garbage collection operations to ensure completion of incoming I/O operations before garbage collection is resumed.

Figure 17:
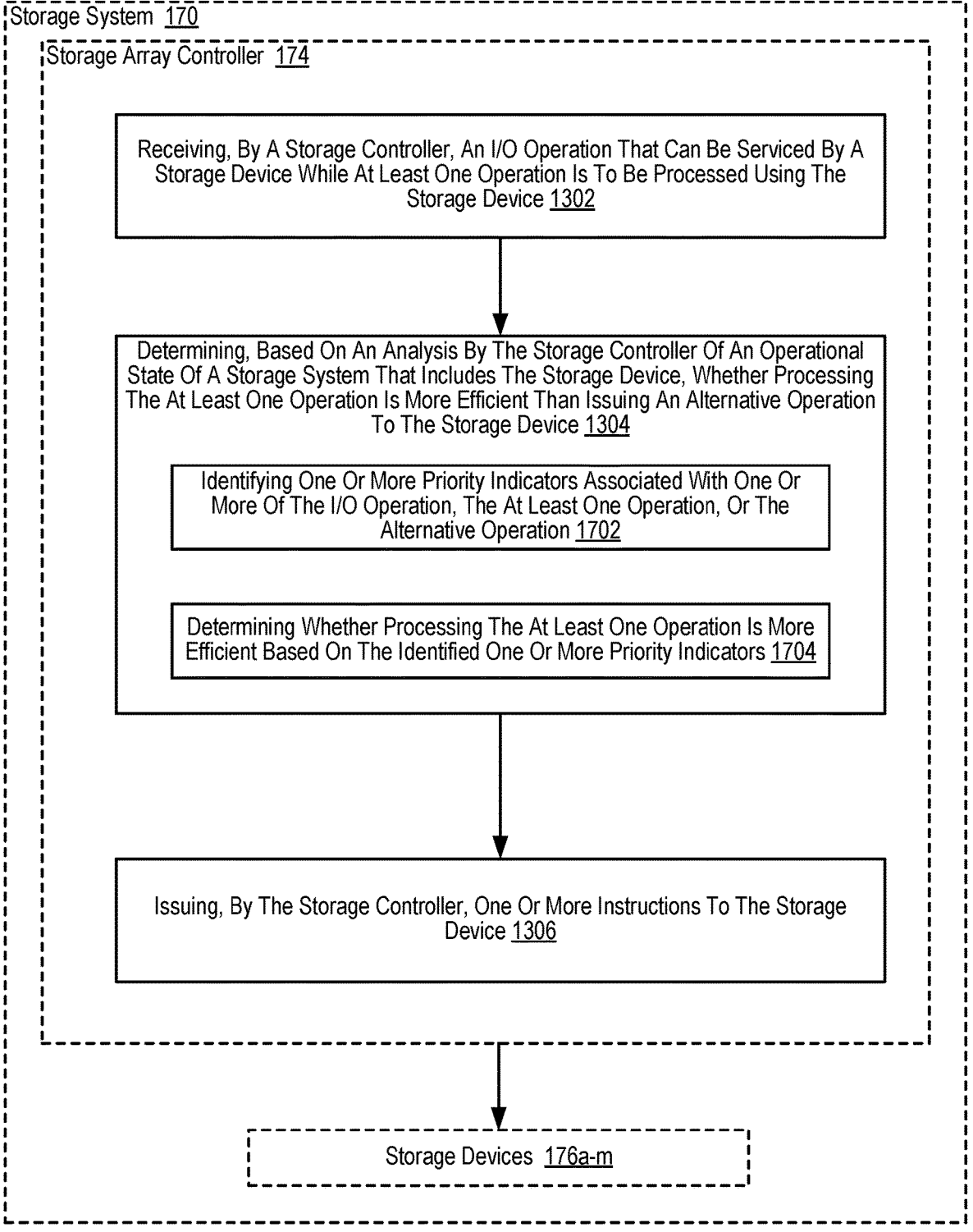
FIG. 17 sets forth a flow chart illustrating an example method of efficient execution of I/O operations in a storage environment.

FIG. 17 sets forth a flow chart illustrating an example method of efficient execution of I/O operations in a storage environment. The example method depicted in FIG. 17 is similar to the example method depicted in FIG. 13, as the example method depicted in FIG. 17 also includes receiving 1302, by a storage controller, an incoming I/O operation that can be serviced by a storage device while at least one pending operation is to be processed using the storage device, determining 1304, based on an analysis by the storage controller of an operational state of a storage system that includes the storage device, whether processing the at least one pending operation is more efficient than issuing an alternative operation to the storage device, and issuing 1306, by the storage controller, one or more instructions to the storage device.

The example method depicted in FIG. 17 differs from the example method of FIG. 13 in that the example method depicted in FIG. 17 also includes identifying 1702 one or more priority indicators associated with one or more of the I/O operation, the at least one pending operation, or the alternative operation. In some embodiments, storage array controller 174 can receive hints about the nature and importance of operations from the authority or from the entity that issued a request for executing an operation. Such hints and other indications can also be referred to as priority indicators that storage array controller 174 can use in determining priority and scheduling of operations. These priority indicators could include operation metadata that indicates whether an operation is latency-sensitive. These priority indicators can include whether an operation needs to or does not need to complete by or within a certain time. Priority indicators can also be provided in the form of pushback or feedback from a storage device, such as information indicating parts of the device that are currently too busy, such as by providing die or segment identifiers. Storage array controller 174 can use these and other hints from the storage device, such as that the storage device has received too many concurrent write or erase requests, or that there are too many read requests directed to the same die. In general, a storage device may communicate one or more device properties to storage array controller 174, such as the layout of packages, die, and planes, erase blocks, and pages, and how packages and buses are connected out. Storage array controller 174 can use this information to determine the most efficient scheduling of incoming and pending operations.

The example method depicted in FIG. 17 also includes determining 1704 whether processing the at least one pending operation is more efficient based on the identified one or more priority indicators. Determining 1704 whether processing the at least one pending operation is more efficient based on the identified one or more priority indicators can include determining whether allowing completion of the pending operation would be more efficient than issuing an alternative operation to the storage device or other storage devices. Moreover, storage array controller 174 can even issue requests to a storage device for a fast response if a scheduled operation cannot be completed within a certain time. For example, a request to the storage device could indicate that an operation be performed only if it can be completed within a certain period of time. In response, the storage device could respond with information indicating that the scheduled operation cannot be completed within the defined timeframe, or that the operation may delay other operations excessively. Storage array controller 174 can use such information from the storage device as a priority indicator for the scheduled operation. Storage array controller 174 can then switch to an alternate method for performing the operation, such as a reconstruct read operation directed to other storage devices or other flash die of the storage device (e.g., as an alternative to a read operation), or by writing data elsewhere or by reading data from a mirror.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated. Additionally, while the above description focuses on networked storage and controller, the above described methods and mechanism may also be applied in systems with direct attached storage, host operating systems, and otherwise.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving, by a storage controller, an incoming input/output (I/O) operation having an associated priority that can be serviced by a storage device while one or more pending operations are to be processed using the storage device;
determining, based on an analysis by the storage controller of an operational state of a storage system and the priority of the incoming I/O operation, whether processing the one or more pending operations is faster than issuing an alternative operation to service the incoming I/O operation; and
in response to determining that processing the one or more pending operations is faster, issuing, by the storage controller, one or more instructions to the storage device that cause the storage device to service the incoming I/O operation.

2. The method of claim 1, wherein the alternative operation accomplishes a same result as processing of the one or more pending operations.

3. The method of claim 1, wherein determining whether issuing the one or more pending operations is faster further comprises:
identifying that the storage device is exhibiting variable response time behavior; and
determining whether the one or more pending operations is faster based on identification.

4. The method of claim 1, wherein the one or more pending operations is a read operation to read a data portion, and wherein determining whether issuing the one or more pending operations is faster further comprises:
determining that issuing a reconstruct read operation for the data portion is faster than the one or more pending operations; and
in response to the determination, issuing the reconstruct read operation to the storage device.

5. The method of claim 1, wherein determining whether processing the one or more pending operations is faster than issuing an alternative operation further comprises:
determining that delaying the one or more pending operations and issuing the alternative operation before issuing the one or more pending operations is faster than executing the one or more pending operations without a delay.

6. The method of claim 1, wherein the operational state is characterized by one or more factors including current system load, read response times, additional overhead at the storage device, one or more types of requests being received.

7. The method of claim 1, wherein the operational state is characterized by a priority of requests being received or a state of other storage devices within the storage system.

8. The method of claim 1, wherein determining whether processing the one or more pending operations is faster further comprises:
identifying one or more priority indicators associated with one or more of the incoming I/O operation, the one or more pending operations, or the alternative operation; and
determining whether processing the one or more pending operations is faster based on the identified one or more priority indicators.

9. An apparatus comprising:
a memory;
a processing device operably coupled to the memory, configured to:
receive, by a storage controller, an incoming input/output (I/O) operation having an associated priority that can be serviced by a storage device while one or more pending operations are to be processed using the storage device;
determine, based on an analysis by the storage controller of an operational state of a storage system and the priority of the incoming I/O operation whether processing the one or more pending operations is faster than issuing an alternative operation to service the incoming I/O operation; and
in response to determining that the one or more pending operations is faster, issue, by the storage controller, one or more instructions to the storage device that cause the storage device to service the incoming I/O operation.

10. The apparatus of claim 9, wherein the alternative operation accomplishes a same result as processing of the one or more pending operations.

11. The apparatus of claim 9, wherein the processing device is further configured to:
identify that the storage device is exhibiting variable response time behavior; and
determine whether the one or more pending operations is faster based on identification.

12. The apparatus of claim 9, wherein the one or more pending operations is a read operation to read a data portion, and wherein to determine whether issuing the one or more pending operations is faster, the processing device is further configured to:
determine that issuing a reconstruct read operation for the data portion is faster than the one or more pending operations; and
in response to the determination, issue the reconstruct read operation to the storage device.

13. The apparatus of claim 9, wherein the processing device is further configured to:

determine that delaying the one or more pending operations and issue the alternative operation before issuing the one or more pending operations is faster than executing the one or more pending operations without a delay.

14. The apparatus of claim 9, wherein the operational state is characterized by one or more factors including current system load, read response times, additional overhead at the storage device, one or more types of requests being received, priority of requests being received, or a state of other storage devices within the storage system.

15. The apparatus of claim 9, wherein the operational state is characterized by a priority of requests being received or a state of other storage devices within the storage system.

16. The apparatus of claim 13, wherein the processing device is further configured to:

identify one or more priority indicators associated with one or more of the incoming I/O operation, the one or more pending operations, or the alternative operation; and determine whether processing the one or more pending operations is faster based on the identified one or more priority indicators.

17. A non-transitory computer readable storage medium storing instructions that, when executed, cause a processing device to:

receive, by a storage controller, an incoming input/output (I/O) operation having an associated priority that can be serviced by a storage device while one or more pending operations are to be processed using the storage device;

determine, based on an analysis by the storage controller of an operational state of a storage system and the priority of the incoming I/O operation whether processing the one or more pending operations is faster than issuing an alternative operation to service the incoming I/O operation; and in response to determining that processing the one or more pending operations is faster, issue, by the storage controller, one or more instructions to the storage device that cause the storage device to service the incoming I/O operation.

18. The non-transitory computer readable storage medium of claim 17, wherein the alternative operation accomplishes a same result as processing of the one or more pending operations.

19. The non-transitory computer readable storage medium of claim 17, wherein the processing device is further configured to:

identify that the storage device is exhibiting variable response time behavior; and determine whether the one or more pending operations is faster based on identification.

20. The non-transitory computer readable storage medium of claim 19, wherein the one or more pending operations is a read operation to read a data portion, and wherein to determine whether issuing the one or more pending operation is faster, wherein the processing device is further configured to:

determine that issuing a reconstruct read operation for the data portion is faster than the one or more pending operations; and in response to the determination, issue the reconstruct read operation to the storage device.

* * * * *